US012755627B2

(12) United States Patent
Ucar et al.

(10) Patent No.: US 12,755,627 B2
(45) Date of Patent: Oct. 6, 2026

(54) SYSTEMS AND METHODS TO VERIFY ROAD CONDITIONS THROUGH VEHICLE DATA

(71) Applicant: TOYOTA MOTOR ENGINEERING & MANUFACTURING NORTH AMERICA, INC., Plano, TX (US)

(72) Inventors: Seyhan Ucar, Mountain View, CA (US); Divya Sai Toopran, Sunnyvale, CA (US); Emrah Akin Sisbot, Mountain View, CA (US); Haritha Muralidharan, Cupertino, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/500,916

(22) Filed: Nov. 2, 2023

(65) Prior Publication Data

US 2025/0148906 A1 May 8, 2025

(51) Int. Cl.
*G08G 1/01* (2006.01)
*G01C 21/34* (2006.01)

(52) U.S. Cl.
CPC ....... *G08G 1/0112* (2013.01); *G01C 21/3407* (2013.01); *G08G 1/0133* (2013.01)

(58) Field of Classification Search
CPC . G08G 1/0112; G08G 1/0133; G01C 21/3407
(Continued)

(56) References Cited

U.S. PATENT DOCUMENTS 7,589,646 B2 * 9/2009 Glover .................. G05D 1/106 340/963
9,361,797 B1 6/2016 Chen
(Continued)

OTHER PUBLICATIONS

Honda, "Honda Conducting Pilot of New Road Condition Monitoring System to Enhance Safety," Honda Corporate News, Dec. 14, 2021, 2 pages (https://hondanews.com/en-US/honda-corporate/releases/release-bc2bc74408027960dba69cafec3f5038-honda-conducting-pilot-of-new-road-condition-monitoring-system-to-enhance-safety).
(Continued)

*Primary Examiner* — Luis A Martinez Borrero
(74) *Attorney, Agent, or Firm* — SHEPPARD, MULLIN, RICHTER & HAMPTON LLP; Daniel N. Yannuzzi

(57) ABSTRACT

Systems and methods are provided for detecting and verifying obstructions on a road. The systems and methods may receive road conditions data from a vehicle. The systems and methods may detect an obstruction from the road conditions data. The systems and methods may determine a vehicle movement pattern according to the obstruction. The systems and methods may generate a verification strategy to verify the obstruction, according to the obstruction and the vehicle movement pattern. The systems and methods may select a subset of vehicles to implement the verification strategy. The systems and methods may send the verification strategy to the subset of vehicles causing the subset of vehicles to collect verification data on the obstruction according to the verification strategy. The systems and methods may receive the verification data on the obstruction from the subset of vehicles. The systems and methods may verify the obstruction based on the verification data.

20 Claims, 9 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 10,048,700 | B1 * | 8/2018 | Curlander | G08G 1/0116 |
| 10,587,998 | B2 | 3/2020 | Altintas | |
| 10,953,887 | B2 | 3/2021 | Magnusson | |
| 11,145,142 | B2 | 10/2021 | Chainer | |
| 11,170,645 | B2 * | 11/2021 | Kamrani | G08G 1/0141 |
| 11,216,888 | B2 * | 1/2022 | Perl | G06Q 40/08 |
| 11,395,118 | B2 | 7/2022 | Higuchi | |
| 11,415,997 | B1 * | 8/2022 | Dolan | G06F 11/3688 |
| 11,530,925 | B1 * | 12/2022 | Shields | G08G 1/164 |
| 11,543,832 | B2 * | 1/2023 | Baldwin | G05D 1/0274 |
| 11,587,441 | B1 * | 2/2023 | Cheng | G07C 5/085 |
| 11,600,174 | B2 * | 3/2023 | Jiao | G07F 17/0014 |
| 11,788,859 | B2 * | 10/2023 | Young | G01C 21/30 381/56 |
| 2014/0160295 | A1 * | 6/2014 | Kyomitsu | G08G 1/0112 340/905 |
| 2016/0171521 | A1 * | 6/2016 | Ramirez | G06Q 10/04 701/409 |
| 2019/0102840 | A1 * | 4/2019 | Perl | G06Q 40/08 |
| 2020/0166360 | A1 * | 5/2020 | Jaganathan | G08G 1/0141 |
| 2020/0394915 | A1 * | 12/2020 | Salles | B60W 10/18 |
| 2021/0063179 | A1 * | 3/2021 | Hayes | B60W 50/14 |
| 2021/0165420 | A1 * | 6/2021 | Baldwin | G05D 1/0274 |
| 2021/0281980 | A1 * | 9/2021 | Xu | H04L 9/3239 |
| 2022/0075365 | A1 | 3/2022 | Ucar | |
| 2022/0111870 | A1 * | 4/2022 | Srivastava | G08G 1/162 |
| 2022/0345859 | A1 * | 10/2022 | Falla Cepeda | G01C 21/3841 |
| 2023/0046137 | A1 | 2/2023 | Suman Reddy | |
| 2023/0082390 | A1 * | 3/2023 | Hayes | B60W 50/14 701/423 |
| 2023/0108406 | A1 | 4/2023 | Kalita | |
| 2023/0204378 | A1 * | 6/2023 | Fowe | G08G 1/0129 701/450 |
| 2023/0273045 | A1 * | 8/2023 | Chintakindi | G01C 21/3691 701/412 |
| 2023/0311930 | A1 * | 10/2023 | Lasram | B60W 60/001 701/2 |
| 2024/0144812 | A1 * | 5/2024 | Nayak | G08G 1/0133 |

OTHER PUBLICATIONS

Madrid et al., "Matrix Profile XX: Finding and Visualizing Time Series Motifs of All Lengths using the Matrix Profile," 2019 IEEE International Conference on Big Knowledge (ICBK), Nov. 2019, pp. 175-182 (https://doi.org/10.1109/ICBK.2019.00031).

Mercer et al., "Introducing the Contrast Profile: A Novel Time Series Primitive that Allows Real World Classification," Data Mining and Knowledge Discovery (DMKD 2022), 36:877-915, Mar. 17, 2022 (https://doi.org/10.1007/s10618-022-00824-5).

Ucar et al., "Chain of Interdependent Vehicular Micro Clouds," 2021 IEEE 93rd Vehicular Technology Conference (VTC2021—Spring), Apr. 2021, 5 pages (https://doi.org/10.1109/VTC2021-Spring51267.2021.9448911).

* cited by examiner

SYSTEMS AND METHODS TO VERIFY ROAD CONDITIONS THROUGH VEHICLE DATA

TECHNICAL FIELD

The present disclosure relates generally to the field of road maintenance, and more particularly to systems and methods for detecting and verifying obstructions on a road.

BACKGROUND OF THE INVENTION

Roads may be used as a means for the public to have a right of passage for vehicles that may be used as a means of transportation. Vehicles may include automobiles, trucks, motorcycles, bicycles, scooters, mopeds, recreational vehicles and other like on- or off-road vehicles. Vehicles may further include autonomous, semi-autonomous and manual vehicles.

With vehicles consistently traveling on roads at all times of the day and year, it may be important for roads to be properly monitored and maintained to ensure the public has adequate and safe pathways (roads, highways, etc.) for travel. With most present vehicles traveling on roads including one or more sensors that may be used to collect data of various objects and components, both internal and external to the respective vehicle, sensors may be used to monitor the condition of roads. While mapping and monitoring systems may be used to monitor and evaluate roads, current programs have difficulty with accurately evaluating road conditions, and detecting and verifying obstructions, which may lead to incidents and accidents occurring on the road, and ground services or resources may need to be diverted solely to evaluate the road conditions which can be costly.

BRIEF SUMMARY OF THE DISCLOSURE

According to various aspects of the disclosed technology, systems and methods for evaluating road conditions, and detecting and verifying obstructions on the road are provided.

In accordance with some implementations, a method for detecting and verifying obstructions on a road is provided. The method may include: receiving, from a vehicle, road conditions data; detecting, from the road conditions data, an obstruction; determining a vehicle movement pattern according to the obstruction; generating a verification strategy according to the obstruction and the vehicle movement pattern; selecting a subset of vehicles to verify the obstruction; sending the verification strategy to the subset of vehicles causing the subset of vehicles to collect verification data on the obstruction according to the verification strategy; receiving the verification data on the obstruction from the subset of vehicles; and verifying the obstruction based on the verification data.

In some applications, the road conditions data may be obtained from a sensor of the vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the obstruction may include at least one of a pothole, crack, tire marking, faded road marking, debris, objects, occlusion, road reflection, flooding, icy surface, oil leak, uneven pavement, erosion and raveling.

In some applications, the selecting the subset of vehicles may include: determining a first vehicle within a distance threshold to the obstruction; and determining the first vehicle comprises a sensor capable of collecting the verification data on the obstruction.

In some applications, the selecting the subset of vehicles may include: determining a first vehicle enroute to the obstruction; and determining the first vehicle comprises a sensor capable of collecting the verification data on the obstruction.

In some applications, the vehicle movement pattern may be updated according to driving data of vehicles encountering the obstruction.

In some applications, the verification strategy may include: routing each of the subset of vehicles to encounter the obstruction; navigating each of the subset of vehicles around the obstruction according to the vehicle movement pattern; and collecting the verification data on the obstruction from each of the subset of vehicles according to the navigation, wherein the verification data is collected by a sensor of each of the subset of vehicles.

In some applications, the method may further include: updating the obstruction based on the verification of the obstruction.

In another aspect, a system for detecting and verifying obstructions on a road is provided that may include one or more processors; and memory coupled to the one or more processors to store instructions, which when executed by the one or more processors, may cause the one or more processors to perform operations. The operations may include: receiving, from a vehicle, road conditions data; detecting, from the road conditions data, an obstruction; determining a vehicle movement pattern according to the obstruction; generating a verification strategy according to the obstruction and the vehicle movement pattern; selecting a subset of vehicles to verify the obstruction; sending the verification strategy to the subset of vehicles causing the subset of vehicles to collect verification data on the obstruction according to the verification strategy; receiving the verification data on the obstruction from the subset of vehicles; and verifying the obstruction based on the verification data.

In some applications, the road conditions data may be obtained from a sensor of the vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the obstruction may include at least one of a pothole, crack, tire marking, faded road marking, debris, objects, occlusion, road reflection, flooding, icy surface, oil leak, uneven pavement, erosion and raveling.

In some applications, the selecting the subset of vehicles may include: determining a first vehicle within a distance threshold to the obstruction; and determining the first vehicle comprises a sensor capable of collecting the verification data on the obstruction.

In some applications, the selecting the subset of vehicles may include: determining a first vehicle enroute to the obstruction; and determining the first vehicle comprises a sensor capable of collecting the verification data on the obstruction.

In some applications, the vehicle movement pattern may be updated according to driving data of vehicles encountering the obstruction.

In some applications, the verification strategy may include: routing each of the subset of vehicles to encounter the obstruction; navigating each of the subset of vehicles around the obstruction according to the vehicle movement pattern; and collecting the verification data on the obstruction from each of the subset of vehicles according to the navigation, wherein the verification data is collected by a sensor of each of the subset of vehicles.

In some applications, the system may further include operations comprising: updating the obstruction based on the verification of the obstruction.

In another aspect, a non-transitory machine-readable medium is provided. The non-transitory computer-readable medium may include instructions that when executed by a processor may cause the processor to perform operations including: receiving, from a vehicle, road conditions data; detecting, from the road conditions data, an obstruction; determining a vehicle movement pattern according to the obstruction; generating a verification strategy according to the obstruction and the vehicle movement pattern; selecting a subset of vehicles to verify the obstruction; sending the verification strategy to the subset of vehicles causing the subset of vehicles to collect verification data on the obstruction according to the verification strategy; receiving the verification data on the obstruction from the subset of vehicles; and verifying the obstruction based on the verification data.

In some applications, the road conditions data may be obtained from a sensor of the vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the obstruction may include at least one of a pothole, crack, tire marking, faded road marking, debris, objects, occlusion, road reflection, flooding, icy surface, oil leak, uneven pavement, erosion and raveling.

In some applications, the selecting the subset of vehicles may include: determining a first vehicle within a distance threshold to the obstruction; and determining the first vehicle comprises a sensor capable of collecting the verification data on the obstruction.

In some applications, the selecting the subset of vehicles may include: determining a first vehicle enroute to the obstruction; and determining the first vehicle comprises a sensor capable of collecting the verification data on the obstruction.

In some applications, the vehicle movement pattern may be updated according to driving data of vehicles encountering the obstruction.

In some applications, the verification strategy may include: routing each of the subset of vehicles to encounter the obstruction; navigating each of the subset of vehicles around the obstruction according to the vehicle movement pattern; and collecting the verification data on the obstruction from each of the subset of vehicles according to the navigation, wherein the verification data is collected by a sensor of each of the subset of vehicles.

In some applications, the non-transitory machine-readable medium may further include operations comprising: updating the obstruction based on the verification of the obstruction.

Other features and aspects of the disclosed technology will become apparent from the following detailed description, taken in conjunction with the accompanying drawings, which illustrate, by way of example, the features in accordance with applications of the disclosed technology. The summary is not intended to limit the scope of any inventions described herein, which are defined solely by the claims attached hereto.

BRIEF DESCRIPTION OF THE DRAWINGS

The present disclosure, in accordance with one or more various applications, is described in detail with reference to the following figures. The figures are provided for purposes of illustration only and merely depict typical or example applications.

Figure 1:
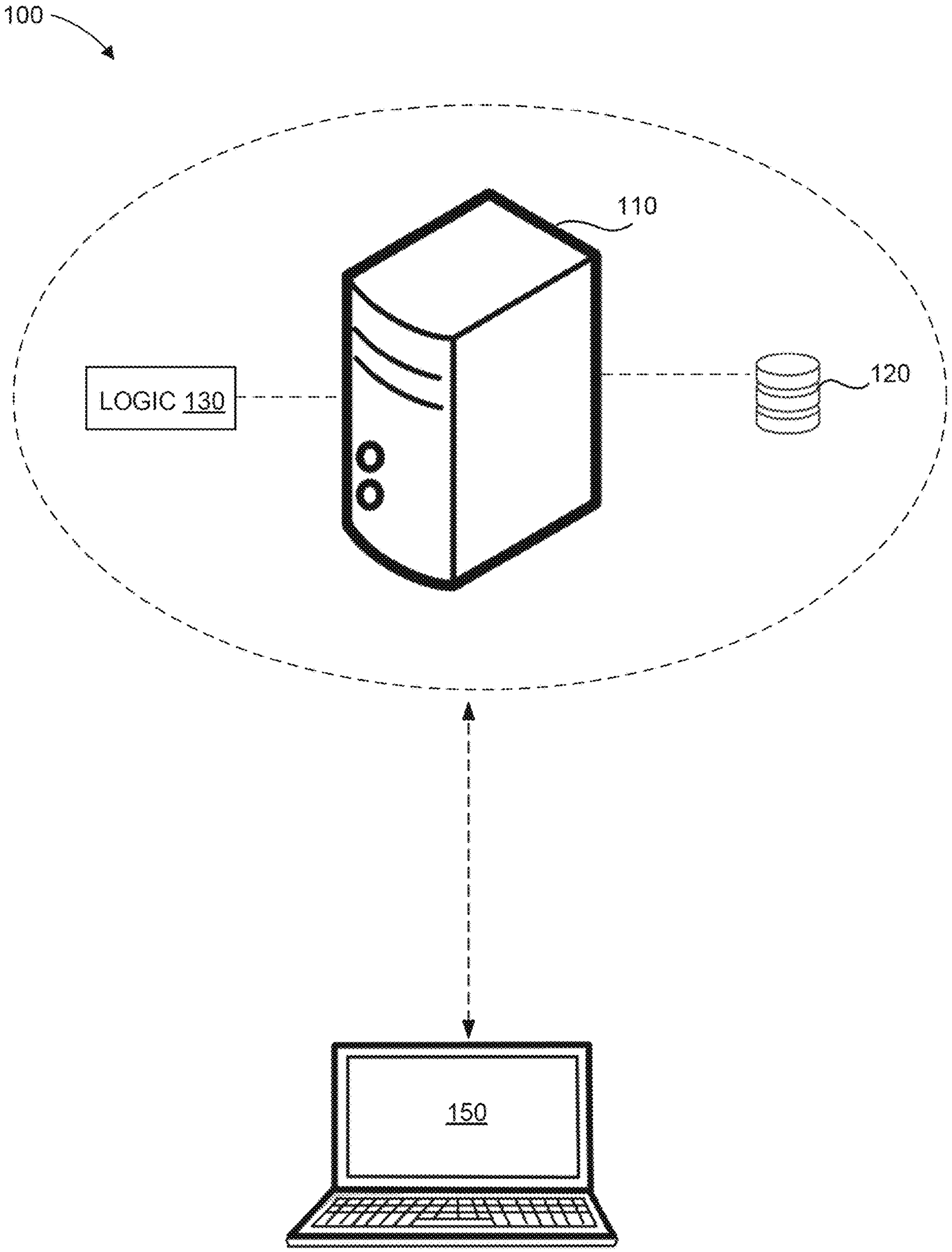
FIG. 1 is an example illustration of a computing system for detecting and verifying obstructions on a road, according to example applications described in the present disclosure.

The figures are not exhaustive and do not limit the present disclosure to the precise form disclosed.

DETAILED DESCRIPTION

As described above, roads may be used as a means for the public to have a right of passage for vehicles that may be used as a means of transportation. Vehicles may include automobiles, trucks, motorcycles, bicycles, scooters, mopeds, recreational vehicles and other like on- or off-road vehicles. Vehicles may further include autonomous, semi-autonomous and manual vehicles. It may be important for roads to be properly monitored and maintained to ensure the public has adequate and safe means of travel. While mapping and monitoring systems may be used to monitor and evaluate roads, current programs have difficulty with accurately and efficiently evaluating road conditions, and detecting and verifying obstructions.

Aspects of the technology disclosed herein may provide systems and methods configured to evaluate road conditions, and detect and verify obstructions. A road condition detection and verification system may use one or more sensors of one or more vehicles to collect data of roads to evaluate road conditions. The road condition detection and verification system may use algorithms to accurately evaluate road conditions to detect one or more obstructions. In particular, aspects of the systems and methods disclosed herein may be configured to generate one or more verification strategies to send to a subset of vehicles to implement an obstructions verification functionality.

A plurality of vehicles traveling on a road may collect initial data regarding or characterizing road conditions on that road. The plurality of vehicles may include, for example, automobiles, trucks, motorcycles, bicycles, scooters, mopeds, recreational vehicles and other like on- or off-road vehicles. The plurality of vehicles may include, for example, an autonomous, semi-autonomous and manual operation. Each of the plurality of vehicles may include one or more sensors that may be used to collect data of road conditions of the road. Each road may also include one or more sensors that may be used to collect data of road conditions of the road. The sensors may include, for example, cameras, image sensors, radar sensors, light detection and ranging (LiDAR) sensors, position sensors, audio sensors, infrared sensors, microwave sensors, optical sensors, haptic sensors, magnetometers, communication systems and global positioning systems (GPS). Data may be received by at least one sensor of a vehicle. The road condition detection and verification system may use one or more sensors of a plurality of vehicles to collect initial road conditions data. The road condition detection and verification system may also use one or more sensors on the road (e.g., road sensors) to collect initial road conditions data.

The initial road conditions data of a road may include information on the condition of the road, damage to the road, hazardous features present on or proximate to the road, and other attributes and characteristics of the road (i.e., the color, size, number of lanes, shape, etc.). The initial road conditions data obtained from one or more sensors of an ego vehicle of the plurality of vehicles and from one or more road sensors on the road may be analyzed by the road condition detection and verification system. Analyzing the initial road conditions data may detect one or more obstructions present on or proximate to the road that the ego vehicle traveled on. An obstruction may include, for example, a pothole, crack, tire marking, faded road marking, debris, object, occlusion, road reflection, flooding, icy surface, oil leak, uneven pavement, erosion and raveling.

Each obstruction may be detected by the road condition detection and verification system according to one or more attributes and characteristics of the road. Different attributes and characteristics of the road may represent various types of obstructions. The types of obstructions and the associated attributes and characteristics of the road for each type of obstruction may be preset and stored in a database. The types of obstructions and the associated attributes and characteristics of the road for each type of obstruction may be updated according to algorithms and models using the initial road conditions data received from various vehicles and various road sensors.

While obstructions may be detected by the road condition detection and verification system by analyzing the initial road conditions data collected, by an ego vehicle using one or more sensors and road sensors, such detected obstructions data may not be fully accurate. The initial road conditions data obtained by one or more sensors of the ego vehicle and one or more road sensors on the road may be interrupted by noise causing inaccuracy in the detection of an obstruction. The obstructions detected from the initial road conditions data may also change over time where an obstruction may disappear or get worse, causing inaccuracy in the type of obstruction that is detected from the initial road conditions data. To determine whether an obstruction is accurately detected and recorded, the road condition detection and verification system may use a subset of additional vehicles to verify the obstruction. The subset of additional vehicles may include a plurality of vehicles different from the ego vehicle that obtained the initial road condition data.

The subset of additional vehicles may be selected by the road condition detection and verification system to verify the obstruction. The subset of additional vehicles may include, for example, automobiles, trucks, motorcycles, bicycles, scooters, mopeds, recreational vehicles and other like on- or off-road vehicles. The subset of additional vehicles may include, for example, an autonomous, semi-autonomous and manual operation. The subset of additional vehicles may include one or more vehicles within a distance threshold to the obstruction. The distance threshold may be a preset. The distance threshold may vary according to the type of the poor road condition. The distance threshold may vary according to the location of the obstruction. The distance threshold may be updated according to algorithms and models using driving data of vehicles.

The subset of additional vehicles may also include one or more vehicles enroute to the obstruction. A vehicle may be determined to be enroute to the obstruction according to the vehicle's location and direction of movement. A vehicle may be determined to be enroute to the obstruction according to a GPS of the vehicle. The GPS of the vehicle may include instructions and directions of a route that the vehicle may follow to reach a particular destination. The instructions and directions of the route of the GPS may include the location of the obstruction.

The subset of additional vehicles may further include one or more vehicles that have one or more sensors capable of collecting verification data on the obstruction. One or more sensors, either individually or in combination, may be able to collect data on the obstruction to verify the type of the obstruction. The one or more sensors of each of the subset of vehicles used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

The subset of additional vehicles may further include one or more vehicles based on performance data of the respective vehicle with regards to how accurately the respective vehicle follows navigation directions. The subset of additional vehicles may further include one or more vehicles that are associated with the road condition detection and verification system, such as, for example, vehicles owned by municipality, including buses, ambulances, autonomous ego motions, city patrollers and the like.

To use the subset of additional vehicles to verify an obstruction, the road condition detection and verification system may generate a verification strategy for each of the subset of vehicles to implement. The verification strategy may be generated by the road condition detection and verification system according to the obstruction detected and a vehicle movement pattern associated with the obstruction. Each obstruction may be associated to a respective vehicle movement pattern. The vehicle movement pattern may be the one or more movements that a vehicle may perform to navigate around the respective obstruction. The vehicle movement pattern may be based on inherent human behavior regarding how a vehicle may be maneuvered around the respective obstruction by a human. Each vehicle movement pattern may be preset and stored in a database. Each vehicle movement pattern may be updated according to algorithms and models using driving data of vehicles. The driving data of vehicles may present, for example, vehicle movements performed by vehicles that encounter the respective obstruction. The road condition detection and verification system may determine the vehicle movement pattern for the detected obstruction.

The verification strategy may include, for example, instructions for one or more vehicles, such as the subset of additional vehicles, to implement to verify the obstruction. The instructions of the verification strategy may include routing a vehicle to encounter the obstruction. The route for a vehicle to take to encounter the obstruction may vary according to a current location of the vehicle. The instructions of the verification strategy may also include navigating the vehicle around the obstruction according to the associated vehicle movement pattern. When a vehicle is routed to the obstruction and encounters the obstruction, the vehicle may perform one or more movements to navigate around the obstruction according to the vehicle movement pattern associated with the obstruction.

The instructions of the verification strategy may further include collecting verification data on the obstruction. As a vehicle is navigating around the obstruction, the vehicle may collect verification data on the obstruction. The verification data may include information on the obstruction to be used to verify the type of the obstruction. The verification data on the obstruction may be collected using one or more sensors of the vehicle implementing the verification strategy. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

The verification strategy may be sent by the road condition detection and verification system to each of the selected subset of additional vehicles. Each of the selected subset of additional vehicles may implement the verification strategy by performing instructions, including being routed to encounter the obstruction, navigating around the obstruction according to one or more vehicle movement patterns associated with the obstruction, and collecting verification data on the obstruction using one or more sensors. After each of the subset of additional vehicles initiates the verification strategy, each of the subset of additional vehicles may send its respective collected verification data on the obstruction to the road condition detection and verification system. The verification data of each of the subset of additional vehicles may be received and combined together by the road condition detection and verification system.

The combined verification data from all of the subset of additional vehicles may be analyzed by the road condition detection and verification system. Analyzing the combined verification data may verify whether or not the obstruction is indeed an obstruction by determining if the obstruction is still present, has been removed, or was made detected in error. Analyzing the combined verification data may verify the type of the obstruction by determining if the obstruction is the same or has changed over time. Analyzing the combined verification data may verify the status of the obstruction and whether the obstruction needs monitoring, maintenance or immediate attention. The obstruction may be categorized according to the analysis of the combined verification data. The obstruction may be updated in the database according to the analysis of the combined verification data. The analysis of the combined verification may also be used to update algorithms and models used to analyze road conditions and detect obstructions. In this way, initial road conditions data may be analyzed to more accurately detect and categorize obstructions. Any obstructions that are detected may also be monitored and attended to in an efficient and timely manner, increasing the avoidance of incidents and accidents occurring on the road.

It should be noted that the terms "accurate," "accurately," and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example of a computing system 100 which may be internal or otherwise associated within a device 150. In some embodiments, the computing system 100 may be a machine learning (ML) pipeline and model, and use ML algorithms. In some examples, the device 150 may be a computing device, such as a desktop computer, a laptop, a mobile phone, a tablet device, an Internet of Things (IoT) device, etc. The device 150 may input data into computing component 110. The computing component 110 may perform one or more available operations on the input data to generate outputs, such as detecting and verifying obstructions. The device 150 may further display the outputs on a Graphical User Interface (GUI). The GUI may be on the device 150 and may display the outputs as a two-dimensional (2D) and three-dimensional (3D) layout and map showing the various outputs generated by algorithms, such as ML algorithms, based on various input data, such as sensor data of road conditions from vehicles and roads.

The computing system 110 in the illustrated example may include one or more processors and logic 130 that implements instructions to carry out the functions of the computing component 110, for example, receiving road conditions data, detecting an obstruction from the road conditions data, determining a vehicle movement pattern according to the obstruction, generating a verification strategy according to the obstruction and the vehicle movement pattern, selecting a subset of vehicles to verify the obstruction, sending the verification strategy to the subset of vehicles, receiving verification data on the obstruction from the subset of vehicles, and verifying the obstruction based on the verification data. The computing component 110 may store, in a database 120, details regarding scenarios or conditions in which some algorithms, image datasets, and assessments are performed and used to detect and verify obstructions. Some of the scenarios or conditions will be illustrated in the subsequent figures.

A processor may include one or more GPUs, CPUs, microprocessors or any other suitable processing system. Each of the one or more processors may include one or more single core or multicore processors. The one or more processors may execute instructions stored in a non-transitory computer readable medium. Logic 130 may contain instructions (e.g., program logic) executable by the one or more processors to execute various functions of computing component 110. Logic 130 may contain additional instructions as well, including instructions to transmit data to, receive data from, and interact with device 150.

ML can refer to methods that, through the use of algorithms, are able to automatically extract intelligence or rules from training data sets and capture the same in informative models. In turn, those models are capable of making predictions based on patterns or inferences gleaned from subsequent data input into a trained model. According to implementations of the disclosed technology, the ML algorithm comprises, among other aspects, algorithms implementing a Gaussian process and the like. The ML algorithms disclosed herein may be supervised and/or unsupervised depending on the implementation. The ML algorithms may emulate the observed characteristics and components of roads, vehicles and drivers to better evaluate road conditions, and determine obstructions and vehicle movement patterns of vehicles to accurately verify obstructions.

Although one example computing system 110 is illustrated in FIG. 1, in various embodiments multiple computing systems 110 can be included. Additionally, one or more systems and subsystems of computing system 100 can include its own dedicated or shared computing component 110, or a variant thereof. Accordingly, although computing system 100 is illustrated as a discrete computing system, this is for ease of illustration only, and computing system 100 can be distributed among various systems or components. The computing component 110 may be, for example, the computing system 210 of FIG. 2, the road condition detection and verification system 300 of FIG. 3, the road condition detection and verification system 400 of FIG. 4, the road condition detection and verification system 500 of FIG. 5, the road condition detection and verification system 600 of FIG. 6, the process 700 of FIG. 7, the computing component 800 of FIG. 8 and the computing component 900 of FIG. 9.

Figure 2:
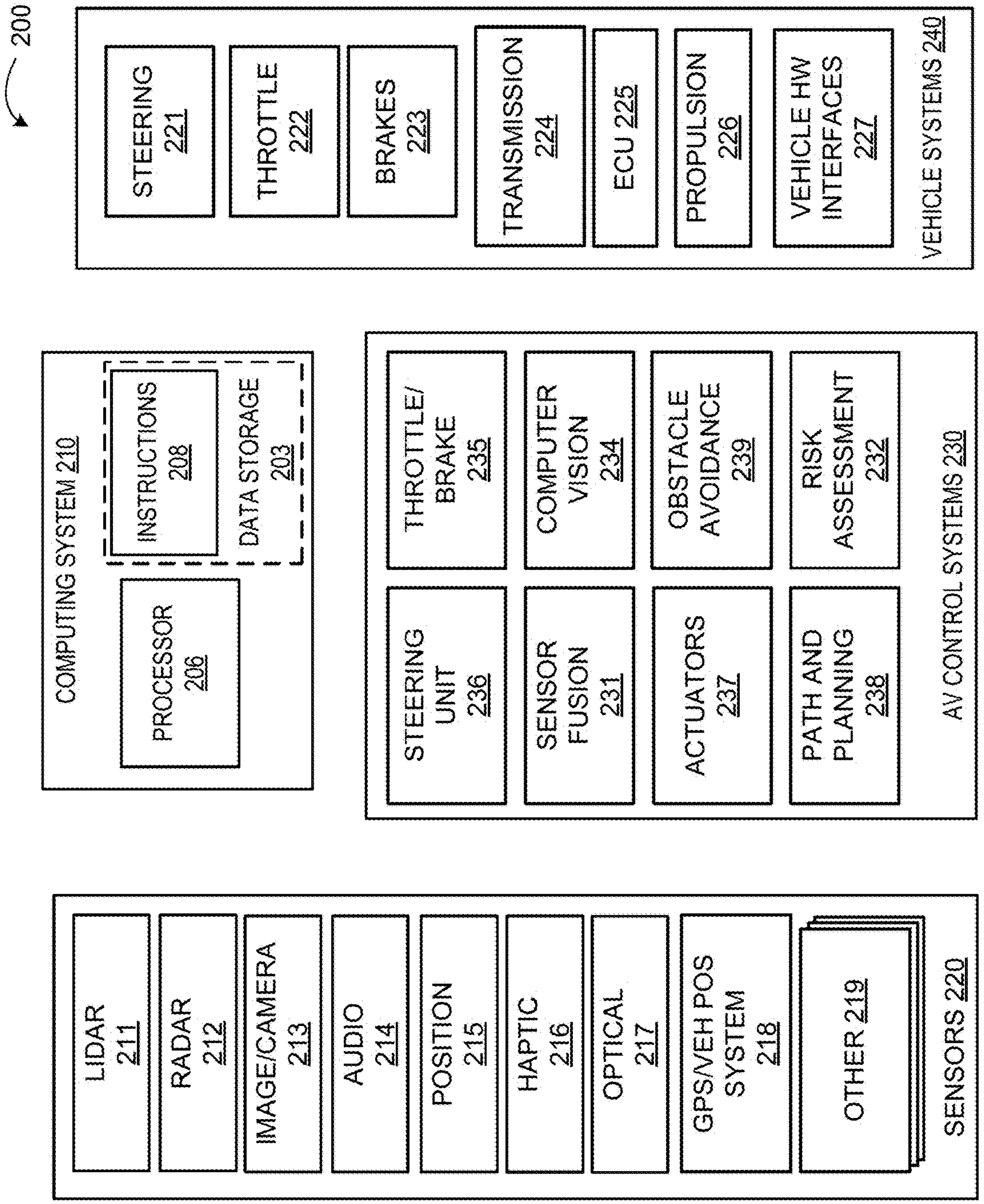
FIG. 2 is an example illustration of a vehicle with which applications of the disclosed technology may be implemented.

FIG. 2 illustrates an example connected vehicle 200, such as an autonomous, semi-autonomous or manual vehicle, with which applications of the disclosed technology may be implemented. As described herein, vehicle 200 can refer to a vehicle, such as an automobile, truck, motorcycle, bicycle, scooter, moped, recreational vehicle and other like on- or off-road vehicles, that may include an autonomous, semi-autonomous and manual operation. The vehicle 200 may include components, such as a computing system 210, sensors 220, AV control systems 230 and vehicle systems 240. Either of the computing system 210, sensors 220, AV control systems 230, and vehicle systems 230 can be part of an automated vehicle system/advanced driver assistance system (ADAS). ADAS can provide navigation control signals (e.g., control signals to actuate the vehicle and operate one or more vehicle systems 240 as shown in FIG. 2) for the vehicle to navigate a variety of situations. As used herein, ADAS can be an autonomous vehicle control system adapted for any level of vehicle control and driving autonomy. For example, the ADAS can be adapted for level 1, level 2, level 3, level 4, and level 5 autonomy (according to SAE standard). ADAS can allow for control mode blending (i.e., blending of autonomous and assisted control modes with human driver control). ADAS can correspond to a real-time machine perception system for vehicle actuation in a multi-vehicle environment. Vehicle 200 may include a greater or fewer quantity of systems and subsystems, and each could include multiple elements. Accordingly, one or more of the functions of the technology disclosed herein may be divided into additional functional or physical components, or combined into fewer functional or physical components. Additionally, although the systems and subsystems illustrated in FIG. 2 are shown as being partitioned in a particular way, the functions of vehicle 200 can be partitioned in other ways. For example, various vehicle systems and subsystems can be combined in different ways to share functionality.

Sensors 220 may include a plurality of different sensors to gather data regarding vehicle 200, its operator, its operation and its surrounding environment. Although various sensors are shown, it can be understood that systems and methods for detecting and responding to intervening obstacles may not require many sensors. It can also be understood that system and methods described herein can be augmented by sensors off the vehicle 200. In this example, sensors 220 include light detection and ranging (LiDAR) sensor 211, radar sensor 212, image sensors 213 (i.e., a camera), audio sensors 214, position sensor 215, haptic sensor 216, optical sensor 219, a Global Positioning System (GPS) or other vehicle positioning system 218, and other like distance measurement and environment sensing sensors 219. One or more of the sensors 220 may gather data, such as road conditions data, and send that data to the vehicle ECU or other processing unit. Sensors 220 (and other vehicle components) may be duplicated for redundancy.

Distance measuring sensors such as LiDAR sensor 211, radar sensor 212, IR sensors and other like sensors can be used to gather data to measure distances and closing rates to various external objects such as other vehicles, roads, traffic signs, pedestrians, light poles and other objects. Image sensors 213 can include one or more cameras or other image sensors to capture images of the environment around the vehicle, such as road surfaces, as well as internal to the vehicle. Information from image sensors 213 (e.g., camera) can be used to determine information about the environment surrounding the vehicle 200 including, for example, information regarding road surfaces and other objects surrounding vehicle 200. For example, image sensors 213 may be able to recognize specific vehicles (e.g. color, vehicle type), landmarks or other features (including, e.g., street signs, traffic lights, etc.), slope of the road, lines on the road, damages and other potentially hazardous conditions to the road, curbs, objects to be avoided (e.g., other vehicles, pedestrians, bicyclists, etc.) and other landmarks or features. Information from image sensors 213 can be used in conjunction with other information such as map data, or information from positioning system 218 to determine, refine, or verify vehicle (ego vehicle or another vehicle) location as well as detect obstructions.

Vehicle positioning system 218 (e.g., GPS or other positioning system) can be used to gather position information about a current location of the vehicle as well as other positioning or navigation information, such as the positioning information about a current location and direction of movement of the vehicle according to a particular road condition.

Other sensors 219 may be provided as well. Other sensors 219 can include vehicle acceleration sensors, vehicle speed sensors, wheelspin sensors (e.g., one for each wheel), a tire pressure monitoring sensor (e.g., one for each tire), vehicle clearance sensors, left-right and front-rear slip ratio sensors, and environmental sensors (e.g. to detect weather, traction conditions, or other environmental conditions). Other sensors 219 can be further included for a given implementation of ADAS. Various sensors 220, such as other sensors 219 may be used to provide input to computing system 210 and other systems of vehicle 200 so that the systems have information useful to detect and verify obstructions.

AV control systems 230 may include a plurality of different systems/subsystems to control operation of vehicle

200. In this example, AV control systems 230 can include, autonomous driving module (not shown), steering unit 236, throttle and brake control unit 235, sensor fusion module 231, computer vision module 234, path and planning module 238, obstacle avoidance module 239, risk assessment module 232 and actuator(s) 239. Sensor fusion module 231 can be included to evaluate data from a plurality of sensors, including sensors 220. Sensor fusion module 231 may use computing system 210 or its own computing system to execute algorithms to assess inputs from the various sensors.

Throttle and brake control unit 235 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 236 may include any of a number of different mechanisms to control or alter the heading of the vehicle. For example, steering unit 236 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 236.

Computer vision module 234 may be included to process image data (e.g., image data captured from image sensors 213, or other image data) to evaluate the environment within or surrounding the vehicle. For example, algorithms operating as part of computer vision module 234 can evaluate still or moving images to determine features and landmarks (e.g., road pavements, lines of the road, damages and other potentially hazardous conditions on the road, road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 234 may be able to model the road traffic vehicle network, predict incoming hazards and obstacles, predict road hazard, and determine one or more contributing factors to identifying obstructions. Computer vision module 234 may be able to perform depth estimation, image/video segmentation, camera localization, and object classification according to various classification techniques (including by applied neural networks).

Path and planning module 238 may be included to compute a desired path for vehicle 200 based on input from various other sensors and systems. For example, path and planning module 238 can use information from positioning system 218, sensor fusion module 231, computer vision module 234, obstacle avoidance module 239 (described below) and other systems (e.g., AV control systems 230, sensors 220, and vehicle systems 240) to determine a safe path to navigate the vehicle along a segment of a desired route. Path and planning module 238 may also be configured to dynamically update the vehicle path as real-time information is received from sensors 220 and other control systems 230.

Obstacle avoidance module 239 can be included to determine control inputs necessary to avoid obstacles and obstructions detected by sensors 220 or AV control systems 230. Obstacle avoidance module 239 can work in conjunction with path and planning module 238 to determine an appropriate path to avoid and navigate around obstacles and obstructions.

Path and planning module 238 (either alone or in conjunction with one or more other module of AV Control system 230, such as obstacle avoidance module 239, computer vision module 234, and sensor fusion module 231) may also be configured to perform and coordinate one or more vehicle maneuvers. Example vehicle maneuvers can include at least one of a path tracking, stabilization and collision avoidance maneuver. With connected vehicles, such as vehicles selected to verify obstructions, vehicle maneuvers can be performed at least partially cooperatively between the connected vehicles to gather a sufficient amount of data of the obstruction. A sufficient amount of data of an obstruction may include collecting data of the obstruction at various angles and perspectives. Each different type of obstruction may warrant a different amount of data to be collected and analyzed to make the needed determinations to verify the obstruction. For example, data needed to verify a small obstruction, like a small pothole, may be minimal as the connected vehicles collecting verification data of the small pothole obstruction may only need to collect data of missing asphalt on the road. The data needed to verify a larger obstruction, like a downed traffic light, may be much more extensive as the connected vehicles collecting verification data of the downed traffic light obstruction may need to collect data of the portion of the roadway blocked by the downed traffic light, electrical issues present on the roadway, disrupted traffic flow caused by the downed traffic light, including, for example, any other vehicles or objects blocking traffic due to the downed traffic light, additional obstructions on the road caused by the downed traffic light, including, for example, cracks, potholes, debris, etc., and so on. Hence, those of ordinary skill in the art will understand what sufficient means in the context of collecting a sufficient amount of data to verify an obstruction.

Vehicle systems 240 may include a plurality of different systems/subsystems to control operation of vehicle 200. In this example, vehicle systems 240 include steering system 221, throttle system 222, brakes 223, transmission 224, electronic control unit (ECU) 225, propulsion system 226 and vehicle hardware interfaces 229. The vehicle systems 240 may be controlled by AV control systems 230 in autonomous, semi-autonomous or manual mode of vehicle 200. For example, in autonomous or semi-autonomous mode, AV control systems 230, alone or in conjunction with other systems, can control vehicle systems 240 to operate the vehicle in a fully or semi-autonomous fashion. When control is assumed, computing system 210 and AV control system 230 can provide vehicle control systems to vehicle hardware interfaces for controlled systems such as steering angle 221, brakes 223, throttle 222, or other hardware interfaces 229, such as traction force, turn signals, horn, lights, etc. This may also include an assist mode in which the vehicle takes over partial control or activates ADAS controls (e.g., AC control systems 230) to assist the driver with vehicle operation.

Computing system 210 in the illustrated example includes a processor 206, and memory 203. Some or all of the functions of vehicle 200 may be controlled by computing system 210. Processor 206 can include one or more GPUs, CPUs, microprocessors or any other suitable processing system. Processor 206 may include one or more single core or multicore processors. Processor 206 executes instructions 208 stored in a non-transitory computer readable medium, such as memory 203.

Memory 203 may contain instructions (e.g., program logic) executable by processor 206 to execute various functions of vehicle 200, including those of vehicle systems and subsystems. Memory 203 may contain additional instructions as well, including instructions to transmit data to, receive data from, interact with, and control one or more of the sensors 220, AV control systems 230 and vehicle systems 240. In addition to the instructions, memory 203 may store data and other information used by the vehicle and its systems and subsystems for operation, including operation of vehicle 200 in the autonomous, semi-autonomous or manual modes. For example, memory 203 can include data that has been communicated to the ego vehicle (e.g. via V2V communication), mapping data, a model of the current or predicted road traffic vehicle network, vehicle dynamics data, computer vision recognition data, and other data which can be useful for the execution of one or more vehicle maneuvers, for example by one or more modules of the AV control systems 230.

Although one computing system 210 is illustrated in FIG. 2, in various applications multiple computing systems 210 can be included. Additionally, one or more systems and subsystems of vehicle 200 can include its own dedicated or shared computing system 210, or a variant thereof. Accordingly, although computing system 210 is illustrated as a discrete computing system, this is for ease of illustration only, and computing system 210 can be distributed among various vehicle systems or components.

Vehicle 200 may also include a (wireless or wired) communication system (not illustrated) to communicate with other vehicles, infrastructure elements, cloud components and other external entities using any of a number of communication protocols including, for example, V2V (vehicle-to-vehicle), V2I (vehicle-to-infrastructure) and V2X (vehicle-to-everything) protocols. Such a wireless communication system may allow vehicle 200 to receive information from other objects including, for example, map data, data regarding infrastructure elements, data regarding operation and intention of surrounding vehicles, and so on. A wireless communication system may allow vehicle 200 to receive updates to data that can be used to execute one or more vehicle control modes, and vehicle control algorithms as discussed herein. Wireless communication system may also allow vehicle 200 to transmit information to other objects and receive information from other objects (such as other vehicles, user devices, or infrastructure). In some applications, one or more communication protocol or dictionaries can be used, such as the SAE J2935 V2X Communications Message Set Dictionary. In some applications, the communication system may be useful in retrieving and sending one or more data useful in detecting and verifying obstructions, as disclosed herein.

Communication system can be configured to receive data and other information from sensors 220 that is used in determining whether and to what extent control mode blending should be activated. Additionally, communication system can be used to send an activation signal or other activation information to various vehicle systems 240 and AV control systems 230 as part of controlling the vehicle. For example, communication system can be used to send signals to one or more of the vehicle actuators 239 to control parameters, for example, maximum steering angle, throttle response, vehicle braking, torque vectoring, and so on.

In some applications, computing functions for various applications disclosed herein may be performed entirely on computing system 210, distributed among two or more computing systems 210 of vehicle 200, performed on a cloud-based platform, performed on an edge-based platform, or performed on a combination of the foregoing.

Path and planning module 238 can allow for executing one or more vehicle control mode(s), and vehicle control algorithms in accordance with various implementations of the systems and methods disclosed herein.

In operation, path and planning module 238 (e.g., by a driver intent estimation module, not shown) can receive information regarding human control input used to operate the vehicle. As described above, information from sensors 220, actuators 239 and other systems can be used to determine the type and level of human control input. Path and planning module 238 can use this information to predict driver action. Path and planning module 238 can use this information to generate a predicted path and model the road traffic vehicle network. This may be useful in evaluating road conditions, and determining and verifying obstructions. As also described above, information from sensors, and other systems can be used to evaluate road conditions, and determine and verify obstructions. Eye state tracking, attention tracking, or intoxication level tracking, for example, can be used to determine vehicle movement patterns according to inherent human behavior. It can be understood that the driver state can contribute to verifying obstructions as disclosed herein. Driver state can be provided to a risk assessment module 232 to determine the level of risk associated with a vehicle operation, and detecting and verifying obstructions. Although not illustrated in FIG. 2, where the assessed risk contributes to determining vehicle movement patterns according to inherent human behaviors, a verification strategy may be generated and provided to vehicle 200 to verify obstructions. Aspects of generating a verification strategy to verify an obstruction will be disclosed with reference to subsequent figures.

Path and planning module 238 can receive state information such as, for example from visibility maps, traffic and weather information, hazard maps, and local map views. Information from a navigation system can also provide a mission plan including maps and routing to path and planning module 238.

The path and planning module 238 (e.g., by a driver intent estimation module, not shown) can receive this information and predict behavior characteristics within a future time horizon. This information can be used by path and planning module 238 for executing one or more planning decisions. Planning decisions can be based on one or more policy (such as defensive driving policy). Planning decisions can be based on one or more level of autonomy, connected vehicle actions, one or more policy (such as defensive driving policy, cooperative driving policy, such as swarm or platoon formation, leader following, etc.). Path and planning module 238 can generate an expected model for the road traffic hazards and assist in creating a predicted traffic hazard level and verification strategy for vehicles to implement.

Path and planning module 238 can receive risk information from risk assessment module 232. Path and planning module 238 can receive vehicle capability and capacity information from one or more vehicle systems 240. Vehicle capability can be assessed, for example, by receiving information from vehicle hardware interfaces 229 to determine vehicle capabilities and identify a reachable set model. Path and planning module 238 can receive surrounding environment information (e.g., from computer vision module 234, and obstacle avoidance module 239). Path and planning module 238 can apply risk information and vehicle capability and capacity information to trajectory information (e.g., based on a planned trajectory and driver intent) to determine a safe or optimized trajectory for the vehicle given the drivers intent, policies (e.g. safety or vehicle cooperation policies), communicated information, given one or more obstacles in the surrounding environment, and road conditions. This trajectory information can be provided to controller (e.g., ECU 225) to provide partial or full vehicle control in the event of a risk level above threshold. A signal from risk assessment module 232 can be used generate countermeasures described herein. A signal from risk assessment module 232 can trigger ECU 225 or another AV control system 230 to take over partial or full control of the vehicle.

Figure 3:
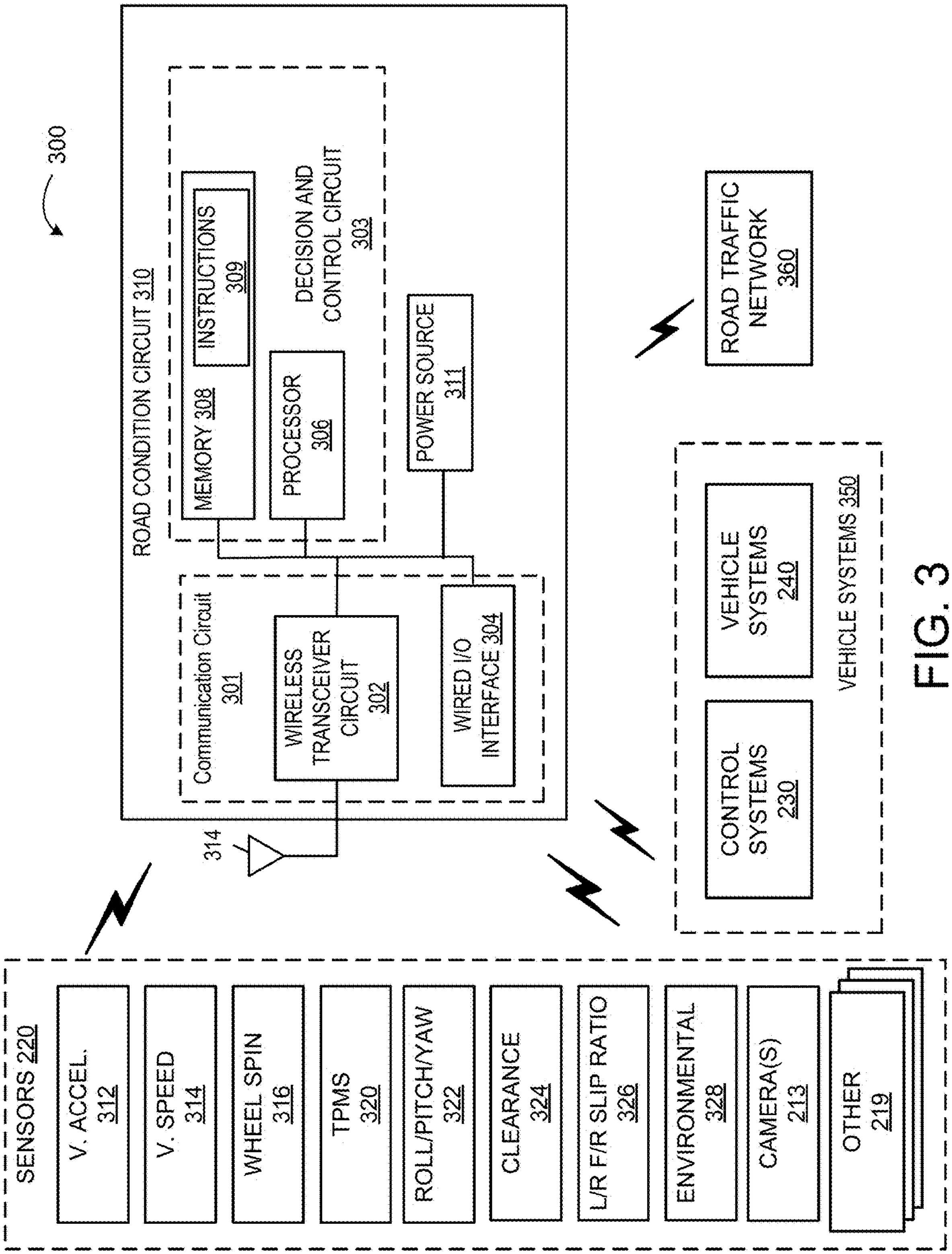
FIG. 3 is an example illustration of a system for detecting and verifying obstructions on a road, according to example applications described in the present disclosure.

FIG. 3 illustrates an example architecture for detecting and verifying obstructions described herein. Referring now to FIG. 3, in this example, a road condition detection and verification system 300 includes a road condition detection and verification circuit 310, a plurality of sensors 220, and a plurality of vehicle systems 350. Also included are various elements of road traffic network 360 with which the road condition detection and verification system 300 can communicate. It can be understood that a road traffic network 360 can include various elements that are navigating and important in navigating a road traffic network, such as vehicles, pedestrians (with or without connected devices that can include aspects of road condition detection and verification system 300 disclosed herein), or infrastructure (e.g. traffic signals, sensors, such as traffic cameras, databases, central servers, weather sensors). Other elements of the road traffic network 360 can include connected elements at workplaces, or the home (such as vehicle chargers, connected devices, appliances, etc.).

Road condition detection and verification system 300 can be implemented as and include one or more components of the vehicle 200 shown in FIG. 2. Sensors 220, vehicle systems 350, and elements of road traffic network 360, can communicate with the road condition detection and verification circuit 310 via a wired or wireless communication interface. As previously alluded to, elements of road traffic network 360 can correspond to connected or unconnected devices, infrastructure (e.g. traffic signals, sensors, such as traffic cameras, weather sensors), vehicles, pedestrians, obstacles, etc. that are in a broad or immediate vicinity of ego-vehicle (e.g., vehicle 200) or otherwise important to the navigation of the road traffic network (such as remote infrastructure). Although sensors 220, vehicle systems 350, and road traffic network 360, are depicted as communicating with road condition detection and verification circuit 310, they can also communicate with each other, as well as with other vehicle systems 350 and directly with element of a road traffic network 360. Data as disclosed herein can be communicated to and from the road condition detection and verification circuit 310. For example, various infrastructure (example element of road traffic network 360) can include one or more databases, such as vehicle crash data or weather data. This data can be communicated to the circuit 310, and such data can be updated based on outcomes for one or more maneuvers or navigation of the road traffic network, vehicle telematics, driver state (physical and mental), vehicle data from sensors 220 (e.g., tire pressure or brake status) from the vehicle. Similarly, traffic data, vehicle state data, time of travel, demographics data for drivers can be retrieved and updated. All of this data can be included in and contribute to predictive analytics (e.g., by machine learning) of accident possibility, and determinations of road conditions and poor, hazard road conditions. Similarly, models, circuits, and predictive analytics can be updated according to various outcomes.

Road condition detection and verification circuit 310 can evaluate road conditions, detect an obstruction, and generate a verification strategy to verify the obstruction as described herein. As will be described in more detail herein, the detection of obstructions can have one or more contributing factors. Various sensors 220, vehicle systems 350, and road traffic network 360 elements may contribute to gathering data for evaluating road conditions and detecting obstructions. For example, the road condition detection and verification circuit 310 can include at least one of an obstruction detection and response circuit. The road condition detection and verification circuit 310 can be implemented as an ECU or as part of an ECU such as, for example electronic control unit 225. In other applications, road condition detection and verification circuit 310 can be implemented independently of the ECU, for example, as another vehicle system.

Road condition detection and verification circuit 310 can be configured to evaluate road conditions, detect obstructions, and appropriately respond. Road condition detection and verification circuit 310 may include a communication circuit 301 (including either or both of a wireless transceiver circuit 302 with an associated antenna 314 and wired input/output (I/O) interface 304 in this example), a decision and control circuit 303 (including a processor 306 and memory 308 in this example) and a power source 311 (which can include power supply). It is understood that the disclosed road condition detection and verification circuit 310 can be compatible with and support one or more standard or non-standard messaging protocols.

Components of road condition detection and verification circuit 310 are illustrated as communicating with each other via a data bus, although other communication in interfaces can be included. Decision and control circuit 303 can be configured to control one or more aspects of obstruction detection and response. Decision and control circuit 303 can be configured to execute one or more steps described with reference to FIG. 7 and FIG. 8.

Processor 306 can include a GPU, CPU, microprocessor, or any other suitable processing system. The memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308 can be made up of one or more modules of one or more different types of memory, and may be configured to store data and other information as well as operational instructions 309 that may be used by the processor 306 to execute one or more functions of road condition detection and verification circuit 310. For example, data and other information can include vehicle driving data, such as a determined familiarity of the driver with driving and the vehicle. The data can also include values for signals of one or more sensors 220 useful in detecting and verifying obstructions. Operational instruction 309 can contain instructions for executing logical circuits, models, and methods as described herein.

Although the example of FIG. 3 is illustrated using processor and memory circuitry, as described below with reference to circuits disclosed herein, decision and control circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a road condition detection and verification circuit 310. Components of decision and control circuit 303 can be distributed among two or more decision and control circuits 303, performed on other circuits described with respect to road condition detection and verification circuit 310, be performed on devices (such as cell phones) performed on a cloud-based platform (e.g. part of infrastructure), performed on distributed elements of the road traffic network 360, such as at multiple vehicles, user device, central servers, performed on an edge-based platform, and performed on a combination of the foregoing.

Communication circuit 301 may include either or both a wireless transceiver circuit 302 with an associated antenna 314 and a wired I/O interface 304 with an associated hardwired data port (not illustrated). As this example illustrates, communications with road condition detection and verification circuit 310 can include either or both wired and wireless communications circuits 301. Wireless transceiver circuit 302 can include a transmitter and a receiver (not shown), e.g., an obstruction detection and verification broadcast mechanism, to allow wireless communications via any of a number of communication protocols such as, for example, WiFi (e.g. IEEE 802.11 standard), Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by road condition detection and verification circuit 310 to/from other components of the vehicle, such as sensors 220, vehicle systems 350, infrastructure (e.g., servers cloud based systems), and other devices or elements of road traffic network 360. These RF signals can include information of almost any sort that is sent or received by vehicle.

Wired I/O interface 304 can include a transmitter and a receiver (not shown) for hardwired communications with other devices. For example, wired I/O interface 304 can provide a hardwired interface to other components, including sensors 220, vehicle systems 350. Wired I/O interface 304 can communicate with other devices using Ethernet or any of a number of other wired communication protocols whether standardized, proprietary, open, point-to-point, networked or otherwise.

Power source 311 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 311 can be coupled to a power source of the vehicle, such as a battery and alternator. Power source 311 can be used to power the road condition detection and verification circuit 310.

Sensors 220 can include one or more of the previously mentioned sensors 220. Sensors 220 can include one or more sensors that may or not otherwise be included on a standard vehicle (e.g., vehicle 200) with which the road condition detection and verification circuit 310 is implemented. In the illustrated example, sensors 220 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, environmental sensors 328 (e.g., to detect weather, salinity or other environmental conditions), and camera(s) 213 (e.g. front rear, side, top, bottom facing). Additional sensors 219 can also be included as may be appropriate for a given implementation road condition detection and verification system 300.

Vehicle systems 350 can include any of a number of different vehicle components or subsystems used to control or monitor various aspects of the vehicle and its performance. For example, it can include any or all of the aforementioned vehicle systems 240 and control systems 230 shown in FIG. 2. In this example, the vehicle systems 350 may include a GPS or other vehicle positioning system 218.

During operation, road condition detection and verification circuit 310 can receive information from various vehicle sensors 220, vehicle systems 350, and road traffic network 360 to detect obstructions. Also, the driver, owner, and operator of the vehicle may manually trigger one or more processes described herein for detecting and verifying an obstruction. Communication circuit 301 can be used to transmit and receive information between the road condition detection and verification circuit 310, sensors 220 and vehicle systems 350. Also, sensors 220 and road condition detection and verification circuit 310 may communicate with vehicle systems 350 directly or indirectly (e.g., via communication circuit 301 or otherwise). Communication circuit 301 can be used to transmit and receive information between road condition detection and verification circuit 310, one or more other systems of a vehicle 200, but also other elements of a road traffic network 360, such as vehicles, devices (e.g., mobile phones), systems, networks (such as a communications network and central server), and infrastructure.

In various applications, communication circuit 301 can be configured to receive data and other information from sensors 220 and vehicle systems 350 that is used in detecting and verifying obstructions. As one example, when data is received from an element of road traffic network 360 (such as from a driver's user device), communication circuit 301 can be used to send an activation signal and activation information to one or more vehicle systems 350 or sensors 220 for the vehicle to implement a verification strategy to verify an obstruction. For example, it may be useful for vehicle systems 350 or sensors 220 to provide data useful in detecting and verifying an obstruction. Alternatively, road condition detection and verification circuit 310 can be continuously receiving information from vehicle system 350, sensors 220, other vehicles, devices and infrastructure (e.g., those that are elements of road traffic network 360). Further, upon detecting an obstruction, communication circuit 301 can send a signal to other components of the vehicle, infrastructure, or other elements of the road traffic network based on the detection of the obstruction. For example, the communication circuit 301 can send a signal to a vehicle system 350 that indicates a control input for performing one or more vehicle movement patterns to navigate around the obstruction according to the type of road condition. In some applications upon detecting an obstruction, depending on the type of road condition, the driver's control of the vehicle can be prohibited, and control of the vehicle can be offloaded to the ADAS. In more specific examples, upon detection of an obstruction (e.g., by sensors 220, and vehicle system 350 or by elements of the road traffic network 360), one or more signals can be sent to a vehicle system 350, so that an assist mode can be activated and the vehicle can control one or more of vehicle systems 240 (e.g., steering system 221, throttle system 222, brakes 223, transmission 224, ECU 225, propulsion system 226, suspension, and powertrain).

The examples of FIGS. 2 and 3 are provided for illustration purposes only as examples of vehicle 200 and road condition detection and verification system 300 with which applications of the disclosed technology may be implemented. One of ordinary skill in the art reading this description will understand how the disclosed applications can be implemented with vehicle platforms.

FIGS. 4A, 4B, 4C and 4D illustrate an example road condition detection and verification system 400. The road condition detection and verification system 400 may be configured to detect and verify an obstruction. The road condition detection and verification system 400 may use one or more sensors of one or more vehicles and one or more sensors on one or more roads (e.g., road sensors) to collect data of roads to evaluate road conditions to detect and verify obstructions. The one or more vehicles used to collect data to detect and verify obstructions may each use the same road condition detection and verification system 400. Each of the vehicles used to collect data to detect and verify obstructions may each use a separate road condition detection and verification system 400 where each vehicle's respective road condition detection and verification system 400 may communicate to each other. Many variations are possible.

The road condition detection and verification system 400 may use one or more vehicles, such as vehicles 410, 412 and 414, to collect data of the road. Vehicles 410, 412 and 414 may include, for example, an automobile, truck, motorcycle, bicycle, scooter, moped, recreational vehicle and other like on- or off-road vehicles. Vehicles 410, 412 and 414 may include, for example, an autonomous, semi-autonomous and manual operation. Vehicles 410, 412 and 414 may each include one or more sensors that may be used to collect data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). One or more sensors of each vehicle 410, 412 and 414 may be used to observe areas of a road around the vehicles 410, 412 and 414, such as in front of, behind, to the right side of and to the left side of each respective vehicle, and collect data of a road, such as shown by observation 420, 422 and 424 of vehicles 410, 412 and 414, respectively. The one or more sensors of each vehicle may be located at various locations, both externally and internally, of the vehicle, including for example, the front, back, right side and left side of the outer surface of the vehicle. Data of a road may be collected from the areas of the road observed by one or more sensors of vehicles 410, 412 and 414, such as at observations 420, 422 and 424, respectively. The road condition detection and verification system 400 may combine the road data collected by one or more sensors of one or more vehicles with road data collected by one or more sensors on one or more roads. Many variations are possible.

Figures 4A, 4B, 4C, 4D:
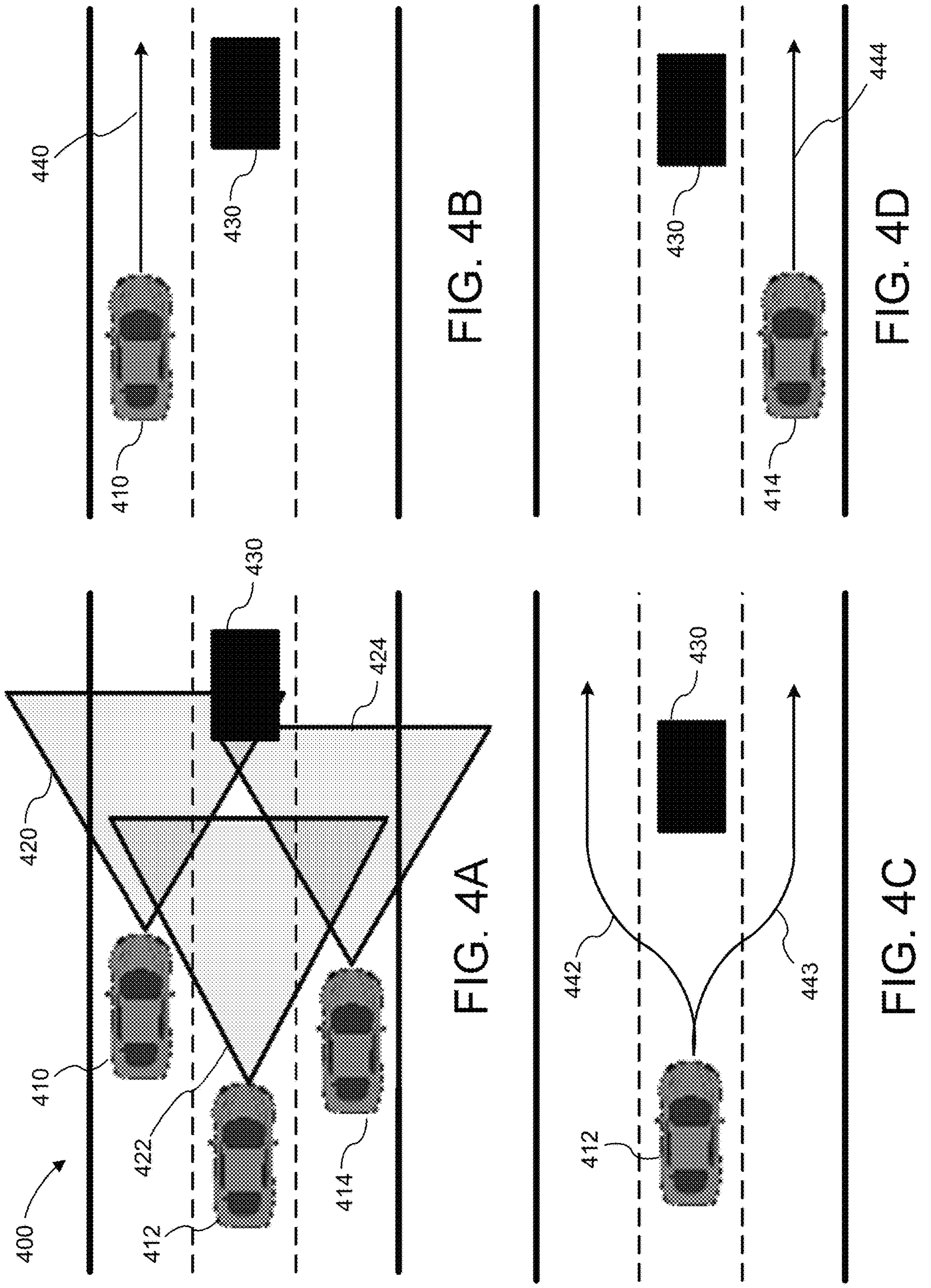
FIGS. 4A, 4B, 4C and 4D are an example illustration of a system for detecting and verifying obstructions on a road, according to example applications described in the present disclosure.

The data of the road collected, by one or more sensors of the vehicles 410, 412 and 414 at observations 420, 422 and 424, respectively, and by one or more sensors on the road, may be used by the road condition detection and verification system 400 to analyze. As shown in FIG. 4A, the road condition detection and verification system 400 may analyze the data of the road to determine the road condition of each part of the road that is observed by a vehicle, such as at observations 420, 422 and 424 of vehicles 410, 412 and 414, respectively. The road condition detection and verification system 400 may analyze the data of the road collected by a vehicle, such as vehicle 410, 412 and 414, to determine one or more attributes and characteristics of the road. Different attributes and characteristics of the road may represent various road conditions. The road condition of a road may include formation on the condition of the road, damages to the road, hazardous features on the road, and attributes of the road (i.e., the color, size, number of lanes, shape, etc.). Many variations are possible.

The road condition detection and verification system 400 may use the data of the road collected, by one or more sensors of one or more vehicles, such as vehicles 410, 412 and 414, and by one or more sensors on the road, to determine one or more attributes and characteristics of the road to detect obstructions. Different attributes and characteristics of the road may represent various obstructions. An obstruction, such as obstruction 430, may include, for example, a pothole, crack, tire marking, faded road marking, debris, object, occlusion, road reflection, flooding, icy surface, oil leak, uneven pavement, erosion and raveling. For example, the road condition detection and verification system 400 may analyze the data of the road collected by vehicles 410, 412 and 414 to detect the obstruction 430. The road condition detection and verification system 400 may determine, from the attributes and characteristics of the road at the location of the obstruction 430, that obstruction 430 may be a pothole, a fallen object or a faded line. The obstructions and the associated attributes and characteristics of the road for each obstruction may be preset and stored in a database. The obstructions and the associated attributes and characteristics of the road for each obstruction may be updated according to algorithms and models using road conditions data received from various vehicles and various road sensors. Many variations are possible.

When the road condition detection and verification system 400 detects that a vehicle, such as vehicles 410, 412 and 414, is encountering an obstruction, such as obstruction 430, then the road condition detection and verification system 400 may collect and analyze driving data of vehicles navigating around the obstruction. The driving data of a vehicle navigating around the obstruction may illustrate one of various ways that a vehicle, such as vehicles 410, 412 and 414, may maneuver around the obstruction, such as obstruction 430. For example, in FIG. 4B, vehicle 410 may observe the obstruction 430 to be on the lane to the right of the lane vehicle 410 is traveling on. Vehicle 410 may navigate around the obstruction 430 by continuing to drive straight on the lane it is on, causing vehicle 410 to pass by the obstruction 430 safely. Route 440 may include having the vehicle 410 continue to move straight along the left lane of the road for at least a particular distance. Vehicle 410 may navigate on route 440 to continue driving straight on the lane it is on until it passes by the obstruction 430.

In another example, in FIG. 4C, vehicle 412 may observe the obstruction 430 to be on the same lane that vehicle 412 is traveling on. Vehicle 412 may determine that it will encounter the obstruction 430 if it continues to travel on its current lane. Vehicle 412 may choose to navigate around the obstruction 430 by performing one or more vehicle movements. The one or more vehicle movements performed by vehicle 412 to navigate around the obstruction 430 may cause vehicle 412 to follow a route, such as route 442 or 443. Route 442 may include having the vehicle 412 perform vehicle movements of moving to the left lane and driving on the left lane for at least a particular distance. Route 443 may include having the vehicle 412 perform vehicle movements of moving to the right lane and driving on the right lane for at least a particular distance. The vehicle 412 may perform one or more vehicle movements to follow route 442 or 443 until it passes by the obstruction 430.

In another example, in FIG. 4D, vehicle 414 may observe the obstruction 430 to be on the lane to the left of the lane vehicle 414 is traveling on. Vehicle 414 may navigate around the obstruction 430 by continuing to drive straight on the lane it is on, causing vehicle 414 to pass by the obstruction 430 safely. Route 444 may include having the vehicle 414 continue to move straight along the right lane of the road for at least a particular distance. Vehicle 414 may to navigate on route 444 to continue driving straight on the lane it is on until it passes by the obstruction 430.

The vehicle movements and routes, such as routes 440, 442, 443 and 444, that a vehicle, such as vehicles 410, 412 and 414, may perform to navigate around an obstruction, such as obstruction 430, may be associated with inherent human behaviors. Inherent human behaviors may be actions that an individual may choose to perform when encountering particular situations. Different inherent human behaviors may be associated with different situations, such as when encountering an obstruction. Different human behaviors may be associated with different obstructions that an individual may encounter when driving a vehicle, such as vehicles 410, 412 and 414. The inherent human behavior associated with an obstruction may result in one or more vehicle movements to be made by a vehicle to navigate around the obstruction. The inherent human behavior and the one or more vehicle movements associated with an obstruction may be preset and stored in a database for the road condition detection and verification system 400 to retrieve. The inherent human behavior and the one or more vehicle movements associated with an obstruction may be updated according to driving data of vehicles received and analyzed by the road condition detection and verification system 400.

Figure 6B:
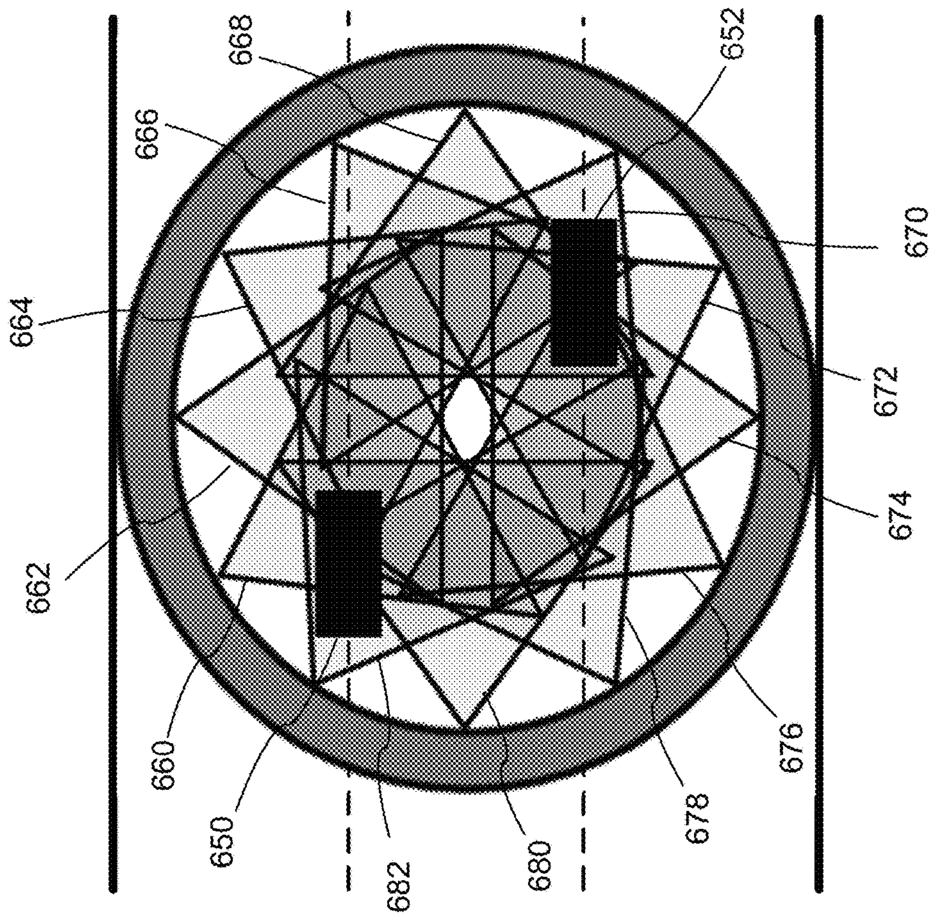
FIGS. 6A and 6B are an example illustration of a system for detecting and verifying obstructions on a road, according to example applications described in the present disclosure.
Figure 6A:
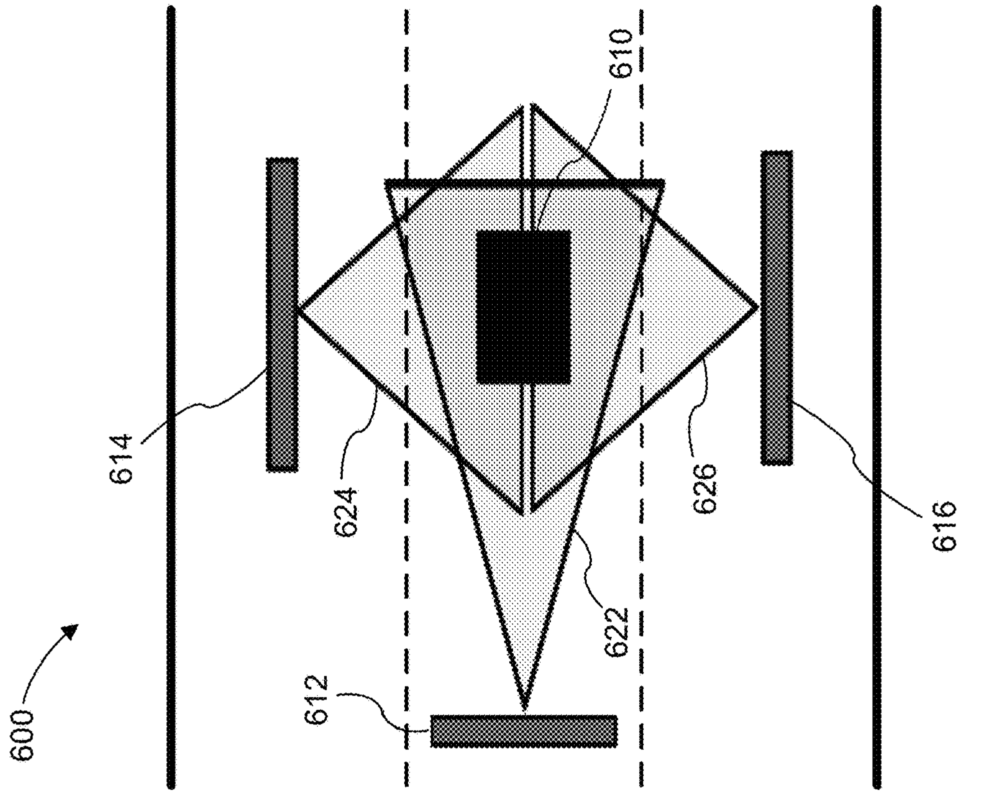
Figure 7:
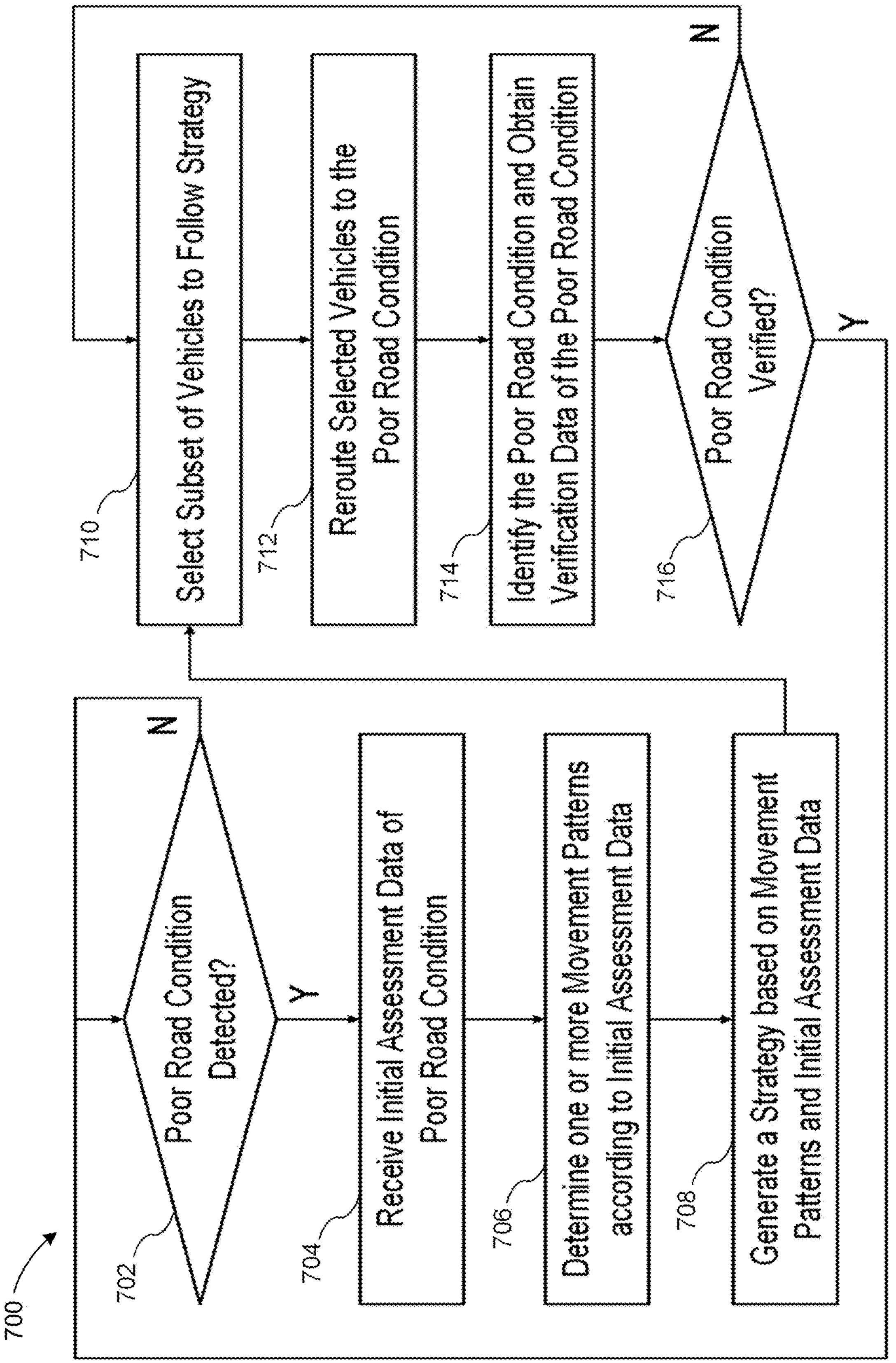
FIG. 7 is an example illustration of a process for detecting and verifying obstructions on a road, according to example applications described in the present disclosure.
Figure 8:
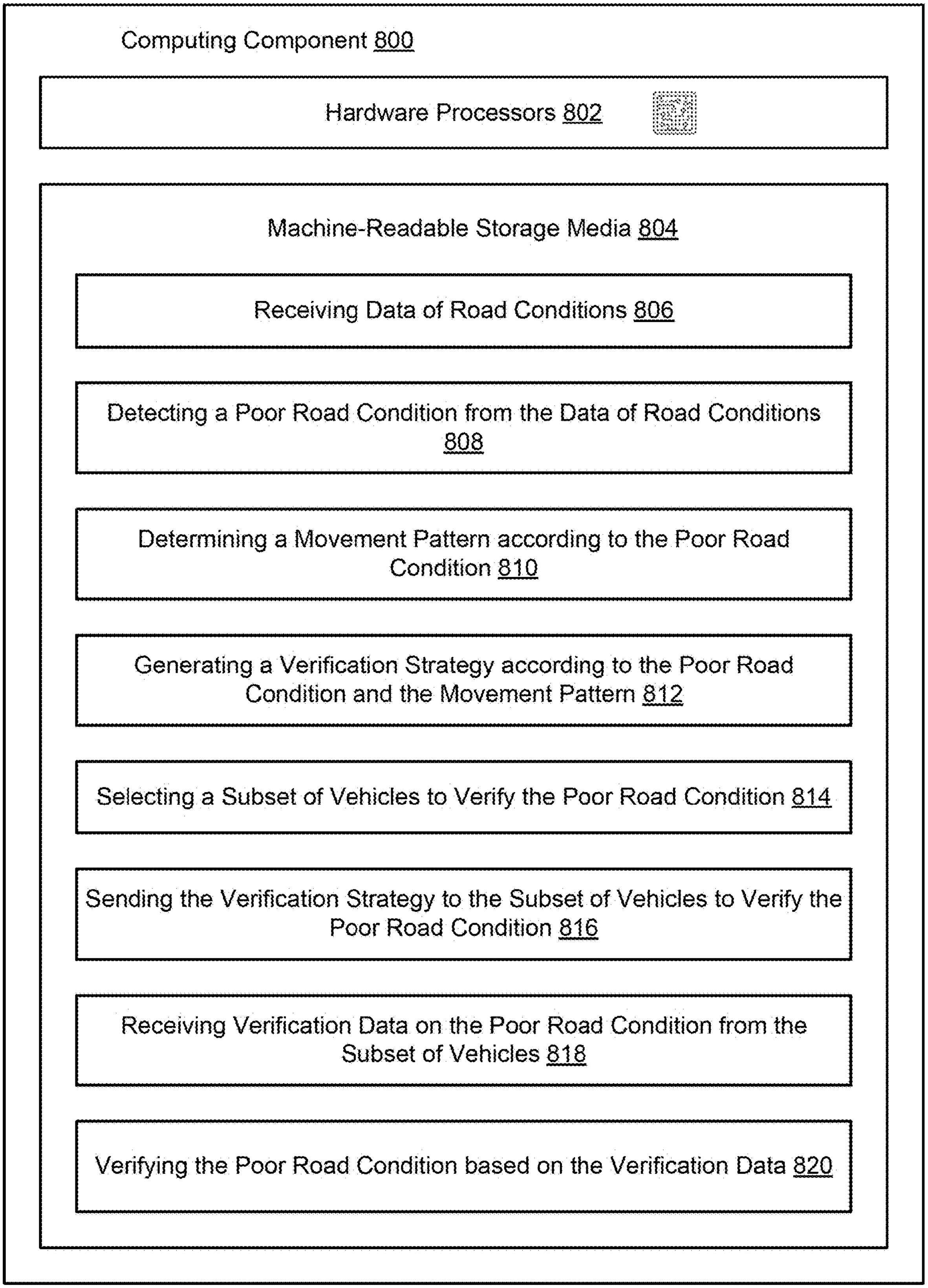
FIG. 8 is an example illustration of a computing component that includes one or more hardware processors and machine-readable storage media storing a set of machine-readable/machine-executable instructions that, when executed, cause the one or more hardware processors to perform an illustrative method for detecting and verifying obstructions on a road, according to example embodiments described in the present disclosure.
Figure 9:
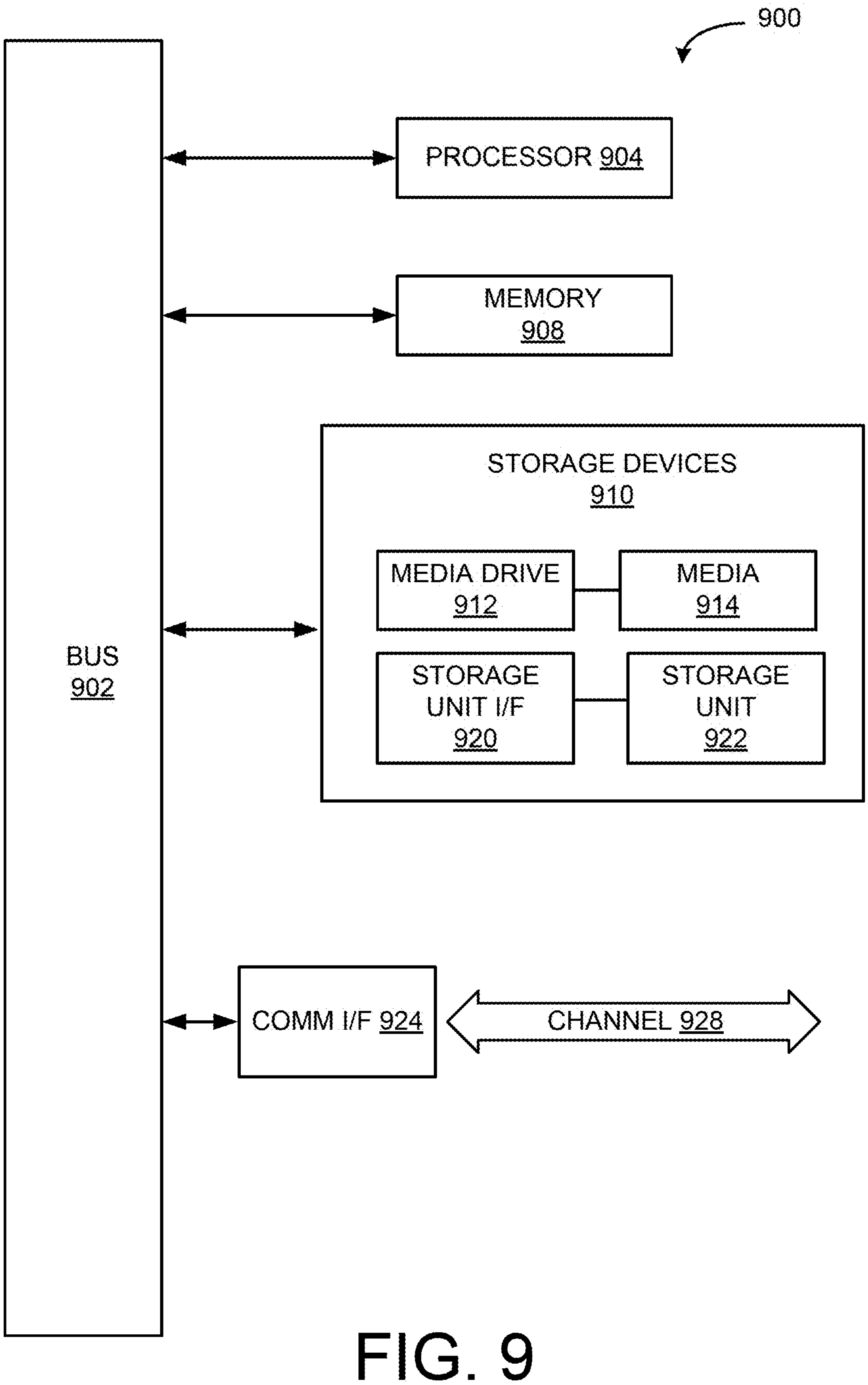
FIG. 9 is an example illustration of a computing component that may be used to implement various features of embodiments described in the present disclosure.

The road condition detection and verification system 400 may be implemented as the computing component 110 of FIG. 1, the computing system 210 of FIG. 2, the road condition detection and verification system 300 of FIG. 3, the road condition detection and verification system 500 of FIG. 5, the road condition detection and verification system 600 of FIG. 6, the process 700 of FIG. 7, the computing component 800 of FIG. 8 and the computing component 900 of FIG. 9.

Figure 5A:
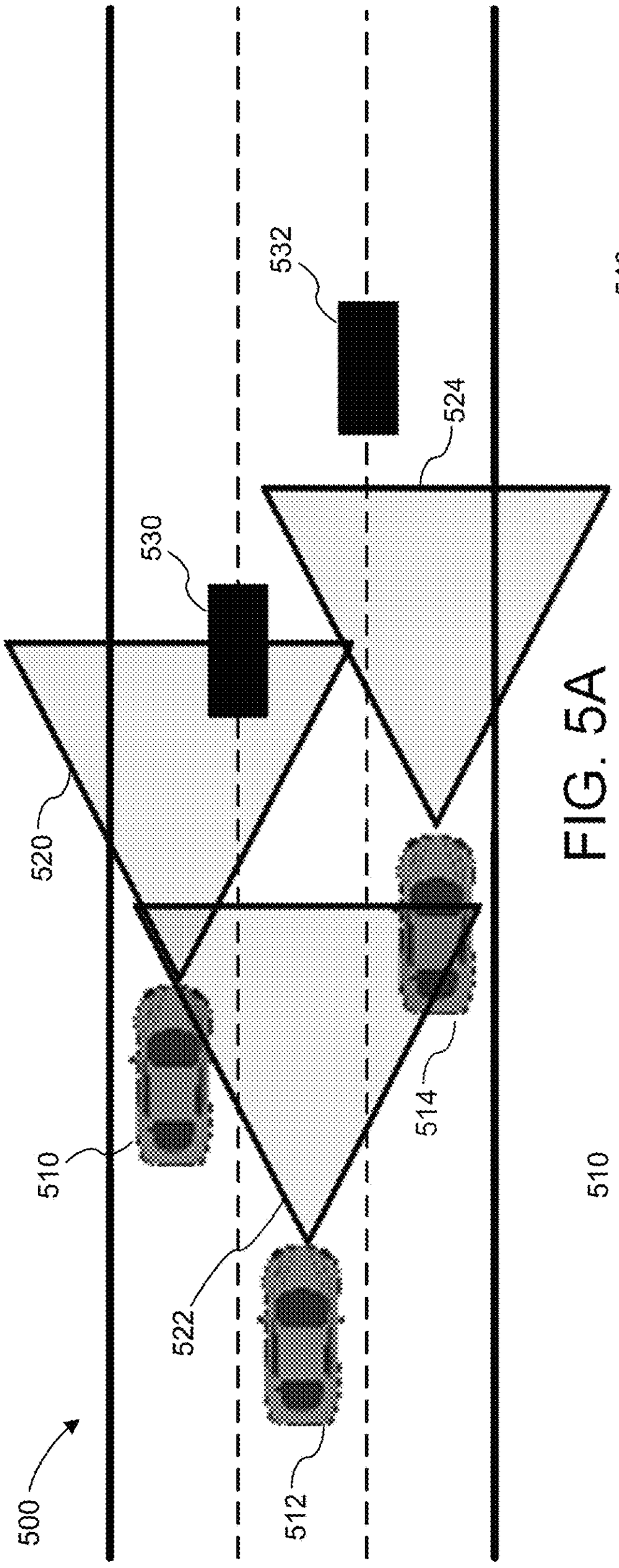
FIGS. 5A and 5B are an example illustration of a system for detecting and verifying obstructions on a road, according to example applications described in the present disclosure.
Figure 5B:
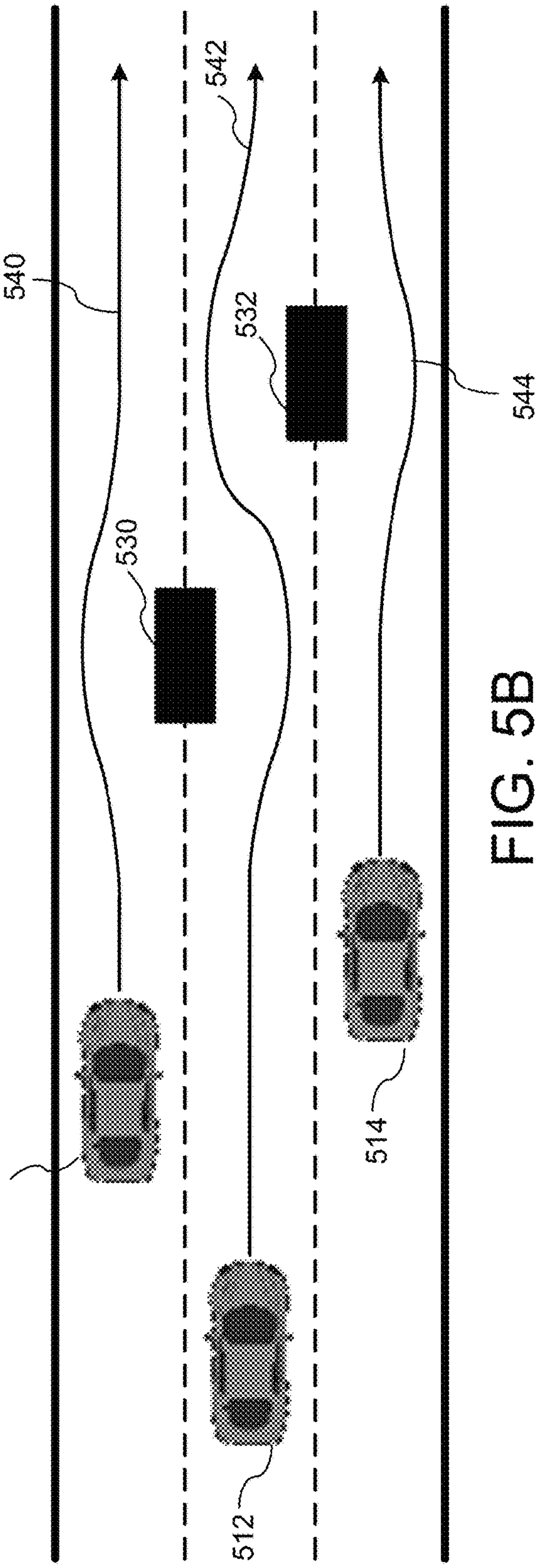

FIGS. 5A and 5B illustrate an example road condition detection and verification system 500. The road condition detection and verification system 500 may be configured to detect and verify an obstruction. The road condition detection and verification system 500 may use one or more sensors of one or more vehicles and one or more sensors on one or more roads to collect data of roads to evaluate road conditions to detect and verify obstructions. The one or more vehicles used to collect data to detect and verify obstructions may each use the same road condition detection and verification system 500. Each of the vehicles used to collect data to detect and verify obstructions may each use a separate road condition detection and verification system 500 where each vehicle's respective road condition detection and verification system 500 may communicate to each other. Many variations are possible.

The road condition detection and verification system 400 may use one or more vehicles, such as vehicles 510, 512 and 514, to collect data of the road. Vehicles 510, 512 and 514 may include, for example, an automobile, truck, motorcycle, bicycle, scooter, moped, recreational vehicle and other like on- or off-road vehicles. Vehicles 510, 512 and 514 may include, for example, an autonomous, semi-autonomous and manual operation. Vehicles 510, 512 and 514 may each include one or more sensors that may be used to collect data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). One or more sensors of each vehicle 510, 512 and 514 may be used to observe areas of a road around the vehicles 510, 512 and 514, such as in front of, behind, to the right side of and to the left side of each respective vehicle, and collect data of a road, such as shown by observation 520, 522 and 524 of vehicles 510, 512 and 514, respectively. Data of a road may be collected from the areas of the road observed by one or more sensors of vehicles 510, 512 and 514, such as at observations 520, 522 and 524, respectively. The road condition detection and verification system 500 may combine the road data collected by one or more sensors of one or more vehicles with road data collected by one or more sensors on one or more roads. Many variations are possible.

The data of the road collected, by one or more sensors of the vehicles 510, 512 and 514 at observations 520, 522 and 524, respectively, and by one or more sensors on the road, may be used by the road condition detection and verification system 500 to analyze. As shown in FIG. 5A, the road condition detection and verification system 500 may analyze the data of the road to determine the road condition of each part of the road that is observed by a vehicle, such as at observations 520, 522 and 524 of vehicles 510, 512 and 514, respectively. The road condition detection and verification system 500 may analyze the data of the road collected by a vehicle, such as vehicle 510, 512 and 514, to determine one or more attributes and characteristics of the road. Different attributes and characteristics of the road may represent various road conditions. The road condition of a road may include formation on the condition of the road, damages to the road, hazardous features on the road, and attributes of the road (i.e., the color, size, number of lanes, shape, etc.). Many variations are possible.

The road condition detection and verification system 500 may use the data of the road collected, by one or more sensors of one or more vehicles, such as vehicles 510, 512 and 514, and by one or more sensors on the road, to determine one or more attributes and characteristics of the road to detect obstructions. Different attributes and characteristics of the road may represent various obstructions. An obstruction, such as obstructions 530 and 532, may include, for example, a pothole, crack, tire marking, faded road marking, debris, object, occlusion, road reflection, flooding, icy surface, oil leak, uneven pavement, erosion and raveling. For example, the road condition detection and verification system 500 may analyze the data of the road collected by vehicles 510, 512 and 514 to detect the obstructions 530 and 532. The road condition detection and verification system 500 may determine, from the attributes and characteristics of the road at the location of the obstructions 530 and 532, that obstructions 530 and 532 may each be a faded line, road reflection or occlusion. The obstructions and the associated attributes and characteristics of the road for each obstruction may be preset and stored in a database. The obstructions and the associated attributes and characteristics of the road for each obstruction may be updated according to algorithms and models using road conditions data received from various vehicles and various road sensors. Many variations are possible.

When the road condition detection and verification system 500 detects that a vehicle, such as vehicles 510, 512 and 514, is encountering an obstruction, such as obstructions 530 and 532, then the road condition detection and verification system 500 may collect and analyze driving data of vehicles navigating around the obstruction. The driving data of a vehicle navigating around the obstruction may illustrate one of various ways that a vehicle, such as vehicles 510, 512 and 514, may maneuver around the obstruction, such as obstructions 530 and 532, as shown in FIG. 5B. For example, vehicle 510 may observe the obstruction 530 to be on the lane line to the right of the lane vehicle 510 is traveling on. Vehicle 510 may navigate around the obstruction 530 by making one or more vehicle movements that follow route 540. Route 540 may include vehicle movements of continuing to travel on the left lane of the road and moving slightly to the left of the left lane when reaching the location of the obstruction 530. Route 540 may also include vehicle movements where upon passing the obstruction 530, vehicle 510 may move back to the middle of the left lane and continue traveling forward in the left lane. Having vehicle 510 follow route 540 may allow vehicle 510 to pass by the obstruction 530 safely.

In another example, vehicle 512 may observe the obstructions 530 and 532. The obstruction 530 may be observed to be on the lane line to the left of the lane vehicle 512 is traveling on. The obstruction 532 may be observed to be on the lane line to the right of the lane vehicle 512 is traveling on. Vehicle 512 may navigate around the obstructions 530 and 532 by making one or more vehicle movements that follow route 542. Route 542 may include vehicle movements of continuing to travel on the middle lane of the road and moving slightly to the right of the middle lane when reaching the location of the obstruction 530. Route 542 may also include vehicle movements where upon passing the obstruction 530, vehicle 512 may move to the left side of the middle lane when reaching the location of the obstruction 532. Route 542 may further include vehicle movements of the vehicle 512 moving back to the middle of the middle lane after passing the obstruction 532 and continue traveling forward in the middle lane. Having vehicle 512 follow route 542 may allow vehicle 512 to pass by the obstructions 530 and 532 safely.

In another example, vehicle 514 may observe the obstruction 532 to be on the lane line to the left of the lane vehicle 514 is traveling on. Vehicle 514 may navigate around the obstruction 532 by making one or more vehicle movements that follow route 544. Route 544 may include vehicle movements of continuing to travel on the right lane of the road and moving slightly to the right of the right lane when reaching the location of the obstruction 532. Route 544 may also include vehicle movements where upon passing the obstruction 532, vehicle 514 may move back to the middle of the right lane and continue traveling forward in the right lane. Having vehicle 514 follow route 544 may allow vehicle 514 to pass by the obstruction 532 safely.

The vehicle movements and routes, such as routes 540, 542 and 544, that a vehicle, such as vehicles 510, 512 and 514, may perform to navigate around an obstruction, such as obstructions 530 and 532, may be associated with inherent human behaviors. Inherent human behaviors may be actions that an individual may choose to perform when encountering particular situations. Different inherent human behaviors may be associated with different situations, such as when encountering an obstruction. Different human behaviors may be associated with different obstructions that an individual may encounter when driving a vehicle, such as vehicles 510, 512 and 514. The inherent human behavior associated with an obstruction may result in one or more vehicle movements to be made by a vehicle to navigate around the obstruction. The inherent human behavior and the one or more vehicle movements associated with an obstruction may be preset and stored in a database for the road condition detection and verification system 500 to retrieve. The inherent human behavior and the one or more vehicle movements associated with an obstruction may be updated according to driving data of vehicles received and analyzed by the road condition detection and verification system 500.

The road condition detection and verification system 500 may be implemented as the computing component 110 of FIG. 1, the computing system 210 of FIG. 2, the road condition detection and verification system 300 of FIG. 3, the road condition detection and verification system 400 of FIG. 4, the road condition detection and verification system 600 of FIG. 6, the process 700 of FIG. 7, the computing component 800 of FIG. 8 and the computing component 900 of FIG. 9.

FIGS. 6A and 6B illustrate an example road condition detection and verification system 600. Upon detecting an obstruction, the road condition detection and verification system 600 may generate a verification strategy. The verification strategy may be based on the obstruction detected and the pattern of associated vehicle movements, as previously described in FIGS. 4A-4D and 5A-5B. The verification strategy may include, for example, instructions for one or more vehicles to implement to verify the obstruction. The instructions of the verification strategy may include routing a vehicle to encounter the obstruction. The route for a vehicle to take to encounter the obstruction may vary according to a current location of the vehicle.

The instructions of the verification strategy may also include navigating the vehicle around the obstruction according to the associated vehicle movement pattern. When a vehicle is routed to the obstruction and encounters the obstruction, the vehicle may perform one or more movements to navigate around the obstruction according to the vehicle movement pattern associated with the obstruction. The instructions of the verification strategy may further include collecting verification data on the obstruction. As the vehicle is navigating around the obstruction, the vehicle may collect verification data on the obstruction. The verification data may include information on the obstruction to verify the type of the obstruction. The verification data on the obstruction may be collected using one or more sensors of the vehicle. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

A subset of vehicles may be selected by the road condition detection and verification system 600 to verify the obstruction. The subset of vehicles may include, for example, one or more vehicles, such as an automobile, truck, motorcycle, bicycle, scooter, moped, recreational vehicle and other like on- or off-road vehicles. Each of the subset of vehicles may include, for example, an autonomous, semi-autonomous and manual operation. The subset of vehicles may include one or more vehicles within a distance threshold to the obstruction.

The distance threshold may be a preset. The distance threshold may vary according to the type of the obstruction. The distance threshold may vary according to the location of the obstruction. The distance threshold may be updated according to algorithms and models using driving data of vehicles. Many variations are possible.

The subset of vehicles may also include one or more vehicles enroute to the obstruction. A vehicle may be determined to be enroute to the obstruction according to the vehicle's location and direction of movement. A vehicle may be determined to be enroute to the obstruction according to a GPS of the vehicle. The GPS of the vehicle may include instructions and directions of a route that the vehicle may follow to reach a particular destination. The instructions and directions of the route of the GPS may include the location of the obstruction.

The subset of vehicles may further include one or more vehicles that have one or more sensors capable of collecting verification data on the obstruction. One or more sensors, either individually or in combination, may be able to collect data on the obstruction to verify the type of the obstruction. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

The subset of vehicles may further include one or more vehicles based on performance data of the respective vehicle with regards to how accurately the respective vehicle follows navigation directions. The subset of vehicles may further include one or more vehicles that are associated with the road condition detection and verification system 600, such as, for example, vehicles owned by municipality, including buses, ambulances, autonomous ego motions, city patrollers and the like.

The road condition detection and verification system 600 may send the verification strategy to each of the selected subset of vehicles. Each of the selected subset of vehicles may initiate the verification strategy to perform instructions, including being routed to encounter the obstruction, navigating around the obstruction according to one or more vehicle movement patterns associated with the obstruction, and collecting verification data on the obstruction using one or more sensors. Each of the selected subset of vehicles may communicate to one another using a P2P (peer-to-peer) or V2V protocol. The road condition detection and verification system 600 may send the verification strategy to one or more vehicles to implement until it receives a sufficient amount of verification data to analyze to determine and verify the type of the obstruction. The selected subset of vehicles may move as a convoy or a platoon, according to the verification strategy. If the road condition detection and verification system 600 is unable to determine and verify the type of the obstruction after analyzing the received verification data, then the road condition detection and verification system 600 may select an additional subset of vehicles and send the verification strategy to the additional subset of vehicles to implement to collect verification data on the obstruction. If the road condition detection and verification system 600 is unable to determine and verify the type of the obstruction after analyzing the received verification data, then the road condition detection and verification system 600 may send the verification data to a system support, such as a human operator, for the system support to analyze and verify. Many variations are possible.

For example, in FIG. 6A, the road condition detection and verification system 600 may generate a verification strategy according to a detected obstruction, such as obstruction 610. The road condition detection and verification system 600 may send the verification strategy to one or more vehicles to verify the obstruction 610. The verification strategy may include instructions for a vehicle to be routed to encounter the obstruction 610, navigate around the obstruction 610 according to one or more vehicle movement patterns associated with the obstruction 610, and collect verification data on the obstruction 610 using one or more sensors of the vehicle. When implementing the verification strategy, one or more vehicles may collect verification data of the obstruction 610, such as verification data 622, 624 and 626, at various locations on the road around the obstruction 610, such as road location 612, 614 and 616, respectively.

One or more vehicles may collect verification data of the obstruction 610, such as verification data 622, 624 and 626, when navigating around the obstruction 610. The navigation of the one or more vehicles around the obstruction 610 may form a U-shape around the obstruction 610. The road condition detection and verification system 600 may receive the collected verification data, such as verification data 622, 624 and 626, from each of the one or more vehicles implementing the verification strategy. Each vehicle implementing the verification strategy may collect verification data, such as verification data 622, 624 and 626, of the obstruction 610, using one or more sensors that are located on the front, right side and left side of the vehicle.

The road condition detection and verification system 600 may send the verification strategy to one or more vehicles to implement until it receives a sufficient amount of verification data to analyze to determine and verify the type of the obstruction 610. If the road condition detection and verification system 600 is unable to determine and verify the type of the obstruction 610 after analyzing the received verification data, then the road condition detection and verification system 600 may select one or more additional vehicles and send the verification strategy to the one or more additional vehicles to implement to collect verification data on the obstruction 610. If the road condition detection and verification system 600 is unable to determine and verify the type of the obstruction after analyzing the received verification data, then the road condition detection and verification system 600 may send the verification data to a system support, such as a human operator, for the system support to analyze and verify. Many variations are possible.

For example, in FIG. 6B, the road condition detection and verification system 600 may generate a verification strategy according to detected obstructions, such as obstructions 650 and 652. The road condition detection and verification system 600 may send the verification strategy to one or more vehicles to verify the obstructions 650 and 652. The verification strategy may include instructions for a vehicle to be routed to encounter the obstructions 650 and 652, navigate around the obstructions 650 and 652 according to one or more vehicle movement patterns associated with the obstructions 650 and 652, and collect verification data on the obstructions 650 and 652 using one or more sensors of the vehicle. When implementing the verification strategy, one or more vehicles may collect verification data of the obstructions 650 and 652, such as verification data 660, 662, 664, 666, 668, 670, 672 674, 676, 678, 680 and 682, at various locations on the road around the obstructions 650 and 652.

One or more vehicles may collect verification data of the obstructions 650 and 652, such as verification data 660, 662, 664, 666, 668, 670, 672 674, 676, 678, 680 and 682, when navigating around the obstructions 650 and 652. The navigation of the one or more vehicles around the obstructions 650 and 652 may form a O-shape around the obstructions 650 and 652. The road condition detection and verification system 600 may receive the collected verification data, such as verification data 660, 662, 664, 666, 668, 670, 672 674, 676, 678, 680 and 682, from each of the one or more vehicles implementing the verification strategy. Each vehicle implementing the verification strategy may collect verification data, such as verification data 660, 662, 664, 666, 668, 670, 672 674, 676, 678, 680 and 682, of the obstructions 650 and 652, using one or more sensors that are located on the front, right side, left side and backend of the vehicle.

The road condition detection and verification system 600 may send the verification strategy to one or more vehicles to implement until it receives a sufficient amount of verification data to analyze to determine and verify the type of the obstructions 650 and 652. If the road condition detection and verification system 600 is unable to determine and verify the type of the obstructions 650 and 652 after analyzing the received verification data, then the road condition detection and verification system 600 may select one or more additional vehicles and send the verification strategy to the one or more additional vehicles to implement to collect verification data on the obstructions 650 and 652. If the road condition detection and verification system 600 is unable to determine and verify the type of the obstruction after analyzing the received verification data, then the road condition detection and verification system 600 may send the verification data to a system support, such as a human operator, for the system support to analyze and verify. Many variations are possible.

After each of the subset of vehicles initiates the verification strategy, the road condition detection and verification system 600 may receive the collected verification data on the obstruction from each of the subset of vehicles. The road condition detection and verification system 600 may combine the verification data of each of the subset of vehicles, and link the combined and complete verification data to the respective obstruction. The road condition detection and verification system 600 may analyze the combined and complete verification data. Analyzing the combined and complete verification data may verify whether or not the obstruction is indeed an obstruction. Analyzing the combined and complete verification data may verify the type of the obstruction, such as a pothole, crack, tire marking, faded road marking, debris, object, occlusion, road reflection, flooding, icy surface, oil leak, uneven pavement, erosion and raveling. Analyzing the combined verification data may verify the status of the obstruction and whether it needs monitoring, maintenance or immediate attention. The obstruction may be accurately categorized according to the analysis of the combined and complete verification data. The obstruction may be updated in a database according to the analysis of the combined and complete verification data. The analysis of the combined and complete verification data may also be used to update algorithms and models used to analyze road conditions and detect obstructions. In this way, road conditions data may be analyzed to more accurately detect and categorize obstructions. Any obstructions that are detected may also be monitored and attended to in an efficient and timely manner, increasing the avoidance of incidents and accidents occurring on the road.

The road condition detection and verification system 600 may be implemented as, for example, the computing component 110 of FIG. 1, the computing system 210 of FIG. 2, the road condition detection and verification system 300 of FIG. 3, the road condition detection and verification system 400 of FIG. 4, the road condition detection and verification system 500 of FIG. 5, the process 700 of FIG. 7, the computing component 800 of FIG. 8 and the computing component 900 of FIG. 9.

FIG. 7 illustrates an example process 700 that includes one or more steps that may be performed to detect and verify an obstruction. In some applications, the process 700 can be executed, for example by the computing component 110 of FIG. 1. In another application, the process 700 may be implemented as the computing component 110 of FIG. 1. In other applications, the process 700 may be implemented as, for example, the computing system 210 of FIG. 2, the road condition detection and verification system 300 of FIG. 3, the road condition detection and verification system 400 of FIG. 4, the road condition detection and verification system 500 of FIG. 5, the road condition detection and verification system 600 of FIG. 6, the computing component 800 of FIG. 8 and the computing component 900 of FIG. 9. The process 700 may include a server. The process 700 may be implemented by one or more vehicles where the one or more vehicles may form a P2P or V2V network.

At step 702, the computing component 110 receives data of a road. A vehicle traveling on a road may collect data of a road. The vehicle may include, for example, an automobile, truck, motorcycle, bicycle, scooter, moped, recreational vehicle and other like on- or off-road vehicles. The vehicle may include, for example, an autonomous, semi-autonomous and manual operation. The vehicle may include one or more sensors that may be used to collect data of a road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received by at least one sensor of the vehicle. The computing component 110 may use one or more sensors of a vehicle to collect the data of a road. The computing component 110 may combine data of the road collected by one or more sensors of the vehicle with data of the road collected by one or more sensors on the road, such as, for example, road cameras, road sensors, etc.

The data of a road may include information on the condition of the road, damages to the road, hazardous features on the road, and attributes and characteristics of the road (i.e., the color, size, number of lanes, shape, etc.). The data of a road obtained from one or more sensors of a vehicle may be analyzed by the computing component 110. Analyzing the data of a road may detect one or more obstructions on the road that the vehicle traveled on. An obstruction may include, for example, a pothole, crack, tire marking, faded road marking, debris, object, occlusion, road reflection, flooding, icy surface, oil leak, uneven pavement, erosion and raveling. If an obstruction is not detected, the computing component 110 may repeat step 702. If an obstruction is detected, the computing component 110 may proceed to step 704.

At step 704, the computing component 110 receives initial assessment data of the obstruction. Each obstruction may be detected by the computing component 110 according to one or more attributes and characteristics of the road. The computing component 110 may analyze the data of the road to determine the attributes and characteristics of the road at various locations. Each type of obstruction may have its own unique attributes and characteristics of the road. The types of obstructions and the associated attributes and characteristics of the road for each type of obstruction may be preset and stored in a database. The types of obstructions and the associated attributes and characteristics of the road for each type of obstruction may be updated according to algorithms and models using road conditions data received from various vehicles. The computing component 110 may receive initial assessment data of the obstruction, including its attributes and characteristics.

At step 706, the computing component 110 determines one or more movement patterns according to the initial assessment data of the obstruction. Each obstruction may be associated to one or more vehicle movement patterns. A vehicle movement pattern may be the one or more movements that a vehicle may perform to navigate around the respective obstruction. The vehicle movement pattern may be based on inherent human behavior regarding how a vehicle may be maneuvered around the respective obstruction by a human. Each vehicle movement pattern may be preset and stored in a database. Each vehicle movement pattern may be updated according to algorithms and models using driving data of vehicles. The driving data of vehicles may present, for example, vehicle movements performed by vehicles that encounter the respective obstruction. The computing component 110 may determine the vehicle movement pattern for the detected obstruction according to the initial assessment data.

At step 708, the computing component 110 generates a strategy to verify the obstruction. A strategy may be generated by the computing component 110 according to the obstruction detected and the vehicle movement pattern associated with the obstruction. The strategy may include, for example, instructions for one or more vehicles to implement to verify the obstruction. The instructions of the strategy may include routing a vehicle to encounter the obstruction. The route for a vehicle to take to encounter the obstruction may vary according to a current location of the vehicle.

The instructions of the strategy may also include navigating the vehicle around the obstruction according to the associated vehicle movement pattern. When a vehicle is routed to the obstruction and encounters the obstruction, the vehicle may perform one or more movements to navigate around the obstruction according to the vehicle movement pattern associated with the obstruction. The instructions of the strategy may further include collecting verification data on the obstruction. As the vehicle is navigating around the obstruction, the vehicle may collect verification data on the obstruction. The verification data may include information on the obstruction to verify the type of the obstruction. The verification data on the obstruction may be collected using one or more sensors of the vehicle. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

At step 710, the computing component 110 selects a subset of vehicles to follow the strategy. A subset of vehicles may be selected by the computing component 110 to verify the obstruction. The subset of vehicles may include one or more vehicles within a distance threshold to the obstruction. The distance threshold may be a preset. The distance threshold may vary according to the type of the obstruction. The distance threshold may vary according to the location of the obstruction. The distance threshold may be updated according to algorithms and models using driving data of vehicles.

The subset of vehicles may also include one or more vehicles enroute to the obstruction. A vehicle may be determined to be enroute to the obstruction according to the vehicle's location and direction of movement. A vehicle may be determined to be enroute to the obstruction according to a GPS of the vehicle. The GPS of the vehicle may include instructions and directions of a route that the vehicle may follow to reach a particular destination. The instructions and directions of the route of the GPS may include the location of the obstruction.

The subset of vehicles may further include one or more vehicles that have one or more sensors capable of collecting verification data on the obstruction. One or more sensors, either individually or in combination, may be able to collect data on the obstruction to verify the type of the obstruction. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

The subset of vehicles may further include one or more vehicles based on performance data of the respective vehicle with regards to how accurately the respective vehicle follows navigation directions. The subset of vehicles may further include one or more vehicles that are associated with a road condition detection and verification system, such as, for example, vehicles owned by municipality, including buses, ambulances, autonomous ego motions, city patrollers and the like.

At step 712, the computing component 110 reroutes the subset of vehicles to the obstruction. The strategy may be sent by the computing component 110 to each of the selected subset of vehicles. As noted above, each of the selected subset of vehicles may be selected for one or more reasons, including being route to the obstruction according to the vehicle's location and direction of movement, being within a distance threshold to the obstruction and including one or more sensors capable of collecting verification data on the obstruction. Each of the selected subset of vehicles may initiate the strategy to perform instructions, including being routed to encounter the obstruction. When one of the selected subset of vehicles initiates the strategy, that respective vehicle may have its routing information updated so that it will encounter the obstruction according to the strategy. The updated routing information may be displayed on a GPS of the respective vehicle for a human driver to follow, when the respective vehicle is in manual operation. The updated routing information may be synced into a routing and navigation system of the respective vehicle, when the respective vehicle is in autonomous or semi-autonomous operation. Having the respective vehicle follow the updated routing information may ensure that the respective vehicle encounters the obstruction according to the strategy. Each of the selected subset of vehicles may communicate to one another using a P2P (peer-to-peer) or V2V protocol. The selected subset of vehicles may move as a convoy or a platoon, according to the strategy.

At step 714, the computing component 110 identifies the obstruction and obtains verification data of the obstruction. Each of the selected subset of vehicles may implement the strategy by performing instructions, including navigating around the obstruction according to one or more vehicle movement patterns associated with the obstruction when each of the selected subset of vehicles encounters the obstruction. When one of the selected subset of vehicles encounters the obstruction, the computing component 110 may use one or more sensors of the respective vehicle to identify the obstruction. After the computing component 110 identifies the obstruction, the computing component 110 may use one or more sensors of the respective vehicle to collect verification data of the obstruction. The computing component 110 may collect verification data of the obstruction at various locations on the road around the obstruction. The computing component 110 may use one or more sensors of the respective vehicle to collect verification data of the obstruction as the respective vehicle is navigating around the obstruction. The computing component 110 may use sensors located at the front, rear, right side and left side of the respective vehicle to collect verification data of the obstruction. Many variations are possible.

At step 716, the computing component 110 analyzes the verification data to determine if the obstruction is verified. After each of the subset of vehicles implements the strategy and collects respective verification data of the obstruction, each of the subset of vehicles may send its respective verification data on the obstruction to the computing component 110. The computing component 110 may combine all of the verification data of the subset of vehicles and analyze the combined verification data as a whole. Analyzing the combined verification data may verify whether or not the obstruction is indeed an obstruction. Analyzing the combined verification data may verify the type of the obstruction. Analyzing the combined verification data may verify the status of the obstruction and whether it needs monitoring, maintenance or immediate attention.

The obstruction may be categorized according to the analysis of the combined verification data. The obstruction may be updated in the database according to the analysis of the combined verification data. The analysis of the combined verification data may also be used to update algorithms and models used to analyze road conditions and detect obstructions. In this way, road conditions data may be analyzed to more accurately detect and categorize obstructions. Any obstructions that are detected may also be monitored and attended to in an efficient and timely manner, increasing the avoidance of incidents and accidents occurring on the road.

If the obstruction is not verified, the computing component 110 may repeat step 710 by selecting an addition subset of vehicles to follow the strategy to verify the obstruction. If the obstruction is not verified, the computing component 110 may send the verification data to a system support, such as a human operator, for the system support to analyze and verify. If the obstruction is verified, the computing component 110 may proceed to step 702.

For simplicity of description, the process 700 is described as being performed with respect to a single detected obstruction. It should be appreciated that, in a typical embodiment, the computing component 110 may manage the detection of a plurality of obstructions, at various locations, in short succession of one another. For example, in some embodiments, the computing component 110 can perform many, if not all, of the steps in process 700 on a plurality of detected obstructions as data of roads is obtained from a plurality of vehicles.

FIG. 8 illustrates an example computing component 800 that includes one or more hardware processors 802 and machine-readable storage media 804 storing a set of machine-readable/machine-executable instructions that, when executed, cause the hardware processor(s) 802 to perform an illustrative method of verifying obstructions. It should be appreciated that there can be additional, fewer, or alternative steps performed in similar or alternative orders, or in parallel, within the scope of the various examples discussed herein unless otherwise stated. The computing component 800 may be implemented as the computing component 110 of FIG. 1, the computing system 210 of FIG. 2, the road condition detection and verification system 300 of FIG. 3, the road condition detection and verification system 400 of FIG. 4, the road condition detection and verification system 500 of FIG. 5, the road condition detection and verification system 600 of FIG. 6, the process 700 of FIG. 7 and the computing component 900 of FIG. 9.

At step 806, the hardware processor(s) 802 may execute machine-readable/machine-executable instructions stored in the machine-readable storage media 804 to receive road conditions data. A vehicle traveling on a road may collect road conditions data on the road. The vehicle may include, for example, an automobile, truck, motorcycle, bicycle, scooter, moped, recreational vehicle and other like on- or off-road vehicles. The vehicle may include, for example, an autonomous, semi-autonomous and manual operation. The vehicle may include one or more sensors that may be used to collect road conditions data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received by at least one sensor of the vehicle. The road conditions data may include information on the condition of the road, damages to the road, hazardous features on the road, and attributes of the road (i.e., the color, size, number of lanes, shape, etc.).

At step 808, the hardware processor(s) 802 may execute machine-readable/machine-executable instructions stored in the machine-readable storage media 804 to detect an obstruction from the road conditions data. The road conditions data obtained from one or more sensors of a vehicle may be analyzed. Analyzing the road conditions data may detect one or more obstructions on the road that the vehicle traveled on. An obstruction may include, for example, a pothole, crack, tire marking, faded road marking, debris, object, occlusion, road reflection, flooding, icy surface, oil leak, uneven pavement, erosion and raveling.

Each obstruction may be detected according to one or more attributes and characteristics of the road. Different attributes and characteristics of the road may represent various types of obstructions. The types of obstructions and the associated attributes and characteristics of the road for each type of obstruction may be preset and stored in a database. The types of obstructions and the associated attributes and characteristics of the road for each type of obstruction may be updated according to algorithms and models using road conditions data received from various vehicles.

At step 810, the hardware processor(s) 802 may execute machine-readable/machine-executable instructions stored in the machine-readable storage media 804 to determine a vehicle movement pattern according to the obstruction. Each obstruction may be associated to a vehicle movement pattern. The vehicle movement pattern may be the one or more movements that a vehicle may perform to navigate around the respective obstruction. The vehicle movement pattern may be based on inherent human behavior regarding how a vehicle may be maneuvered around the respective obstruction by a human. Each vehicle movement pattern may be preset and stored in a database. Each vehicle movement pattern may be updated according to algorithms and models using driving data of vehicles. The driving data of vehicles may present, for example, vehicle movements performed by vehicles that encounter the respective obstruction.

At step 812, the hardware processor(s) 802 may execute machine-readable/machine-executable instructions stored in the machine-readable storage media 804 to generate a verification strategy according to the obstruction and the vehicle movement pattern. A verification strategy may be generated according to the obstruction detected and the vehicle movement pattern associated with the obstruction. The verification strategy may include, for example, instructions for one or more vehicles to implement to verify the obstruction. The instructions of the verification strategy may include routing a vehicle to encounter the obstruction. The route for a vehicle to take to encounter the obstruction may vary according to a current location of the vehicle.

The instructions of the verification strategy may also include navigating the vehicle around the obstruction according to the associated vehicle movement pattern. When a vehicle is routed to the obstruction and encounters the obstruction, the vehicle may perform one or more movements to navigate around the obstruction according to the vehicle movement pattern associated with the obstruction. The instructions of the verification strategy may further include collecting verification data on the obstruction. As the vehicle is navigating around the obstruction, the vehicle may collect verification data on the obstruction. The verification data may include information on the obstruction to verify the type of the obstruction. The verification data on the obstruction may be collected using one or more sensors of the vehicle. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

At step 814, the hardware processor(s) 802 may execute machine-readable/machine-executable instructions stored in the machine-readable storage media 804 to select a subset of vehicles to verify the obstruction. A subset of vehicles may be selected to verify the obstruction. The subset of vehicles may include one or more vehicles within a distance threshold to the obstruction. The distance threshold may be a preset. The distance threshold may vary according to the type of the obstruction. The distance threshold may vary according to the location of the obstruction. The distance threshold may be updated according to algorithms and models using driving data of vehicles. Many variations are possible.

The subset of vehicles may also include one or more vehicles enroute to the obstruction. A vehicle may be determined to be enroute to the obstruction according to the vehicle's location and direction of movement. A vehicle may be determined to be enroute to the obstruction according to a GPS of the vehicle. The GPS of the vehicle may include instructions and directions of a route that the vehicle may follow to reach a particular destination. The instructions and directions of the route of the GPS may include the location of the obstruction.

The subset of vehicles may further include one or more vehicles that have one or more sensors capable of collecting verification data on the obstruction. One or more sensors, either individually or in combination, may be able to collect data on the obstruction to verify the type of the obstruction. The one or more sensors of the vehicle used to collect the verification data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

The subset of vehicles may further include one or more vehicles based on performance data of the respective vehicle with regards to how accurately the respective vehicle follows navigation directions. The subset of vehicles may further include one or more vehicles that are associated with a road condition detection and verification system, such as, for example, vehicles owned by municipality, including buses, ambulances, autonomous ego motions, city patrollers and the like.

At step 816, the hardware processor(s) 802 may execute machine-readable/machine-executable instructions stored in the machine-readable storage media 804 to send the verification strategy to the subset of vehicles to verify the obstruction. The verification strategy may be sent to each of the selected subset of vehicles. Each of the selected subset of vehicles may initiate the verification strategy to perform instructions, including being routed to encounter the obstruction, navigating around the obstruction according to one or more vehicle movement patterns associated with the obstruction, and collecting verification data on the obstruction using one or more sensors. Each of the selected subset of vehicles may communicate to one another using a P2P (peer-to-peer) or V2V protocol. The selected subset of vehicles may move as a convoy or a platoon, according to the verification strategy, to collect verification data on the obstruction.

At step 818, the hardware processor(s) 802 may execute machine-readable/machine-executable instructions stored in the machine-readable storage media 804 to receive verification data on the obstruction from the subset of vehicles. After each of the subset of vehicles initiates the verification strategy, each subset of vehicles may send its respective collected verification data on the obstruction. The verification data of each of the subset of vehicles may be received and combined together.

At step 820, the hardware processor(s) 802 may execute machine-readable/machine-executable instructions stored in the machine-readable storage media 804 to verify the obstruction based on the verification data. The combined verification data from all of the subset of vehicles may be analyzed. Analyzing the combined verification data may verify whether or not the obstruction is indeed an obstruction. Analyzing the combined verification data may verify the type of the obstruction. Analyzing the combined verification data may verify the status of the obstruction and whether it needs monitoring, maintenance or immediate attention. The obstruction may be categorized according to the analysis of the combined verification data. The obstruction may be updated in the database according to the analysis of the combined verification data. The analysis of the combined verification may also be used to update algorithms and models used to analyze road conditions and detect obstructions. In this way, road conditions data may be analyzed to more accurately detect and categorize obstructions. Any obstructions that are detected may also be monitored and attended to in an efficient and timely manner, increasing the avoidance of incidents and accidents occurring on the road.

As used herein, the terms circuit, system, and component might describe a given unit of functionality that can be performed in accordance with one or more applications of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as user device applications described herein), these software elements can be implemented to operate with a computing or processing component capable of carrying out the functionality described with respect thereto. One such example computing component is shown in FIG. 9. Various applications are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a vehicle (e.g., vehicle 200), user device (such as user device 150), self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability. In another example, a computing component might be found in components making up user device 150, vehicle 200, road condition detection and verification circuit 310, decision and control circuit 303, computing system 100, computing system 210, ECU 225, etc.

Computing component 900 might include, for example, one or more processors, controllers, control components, or other processing devices. This can include a processor, and any one or more of the components making up user device 150 of FIG. 1, vehicle 200 of FIG. 2, computing system 210 of FIG. 2, road condition detection and verification system 300 of FIG. 3, road condition detection and verification system 400 of FIG. 4, road condition detection and verification system 500 of FIG. 5 and road condition detection and verification system 600 of FIG. 6. Processor 904 might be implemented using a general-purpose or special-purpose processing engine such as, for example, a microprocessor, controller, or other control logic. The processor 904 might be specifically configured to execute one or more instructions for execution of logic of one or more circuits described herein, such as road condition detection and verification circuit 310, decision and control circuit 303, and logic for control systems 230. Processor 904 may be configured to execute one or more instructions for performing one or more methods, such as the process described in FIG. 7 and the method described in FIG. 8.

Processor 904 may be connected to a bus 902. However, any communication medium can be used to facilitate interaction with other components of computing component 900 or to communicate externally. In applications, processor 904 may fetch, decode, and execute one or more instructions to control processes and operations for enabling vehicle servicing as described herein. For example, instructions can correspond to steps for performing one or more steps of the process described in FIG. 7 and the method described in FIG. 8.

Computing component 900 might also include one or more memory components, simply referred to herein as main memory 908. For example, random access memory (RAM) or other dynamic memory, might be used for storing information and instructions to be fetched, decoded, and executed by processor 904. Such instructions may include one or more instructions for execution of one or more logical circuits described herein. Instructions can include instructions 208 of FIG. 2, and instructions 309 of FIG. 3 as described herein, for example. Main memory 908 might also be used for storing temporary variables or other intermediate information during execution of instructions to be fetched, decoded, and executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative applications, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage unit 922 and interface 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 922, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport. Obstructions can include one or more potholes, cracks, tire markings, faded road markings, debris, objects, occlusion, road reflection, floodings, icy surfaces, oil leaks, uneven pavement, erosions, raveling and other potentially hazardous conditions on the road. Although roads are references herein, it is understood that the present disclosure is not limited to roads or to 1d or 2d traffic patterns.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof. While various applications of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various applications be implemented to perform the recited functionality in the same order, and with each of the steps shown, unless the context dictates otherwise.

Although the disclosed technology is described above in terms of various exemplary applications and implementations, it should be understood that the various features, aspects and functionality described in one or more of the individual applications are not limited in their applicability to the particular application with which they are described, but instead can be applied, alone or in various combinations, to one or more of the other applications of the disclosed technology, whether or not such applications are described and whether or not such features are presented as being a part of a described application. Thus, the breadth and scope of the technology disclosed herein should not be limited by any of the above-described exemplary applications.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various applications set forth herein are described in terms of exemplary block diagrams, flow charts and other illustrations. As will become apparent to one of ordinary skill in the art after reading this document, the illustrated applications and their various alternatives can be implemented without confinement to the illustrated examples. For example, block diagrams and their accompanying description should not be construed as mandating a particular architecture or configuration.

What is claimed is:

1. A computer implemented method for detecting and verifying obstructions on a road, the method comprising:
- detecting, from road conditions data, an obstruction;
- determining a vehicle movement pattern according to the obstruction;
- generating a verification strategy according to the obstruction and the vehicle movement pattern;
- selecting a subset of vehicles to verify the obstruction;
- controlling the subset of vehicles in accordance with the verification strategy to collect verification data on the obstruction, wherein controlling the subset of vehicles in accordance with the verification strategy comprises routing each of the subset of vehicles to encounter the obstruction and navigating each of the subset of vehicles around the obstruction according to the vehicle movement pattern;
- receiving the verification data on the obstruction from the subset of vehicles; and
- verifying the obstruction based on the verification data.

2. The method of claim 1, wherein the road conditions data is obtained from a sensor of a vehicle.

3. The method of claim 2, wherein the sensor comprises at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

4. The method of claim 1, wherein the obstruction comprises at least one of a pothole, crack, tire marking, faded road marking, debris, objects, occlusion, road reflection, flooding, ice, oil leak, uneven pavement, erosion and raveling.

5. The method of claim 1, wherein the selecting the subset of vehicles comprises:
- determining a first vehicle within a distance threshold to the obstruction; and
- determining the first vehicle comprises a sensor capable of collecting the verification data on the obstruction.

6. The method of claim 1, wherein the selecting the subset of vehicles comprises:
- determining a first vehicle enroute to the obstruction; and
- determining the first vehicle comprises a sensor capable of collecting the verification data on the obstruction.

7. The method of claim 1, wherein the vehicle movement pattern is updated according to driving data of vehicles encountering the obstruction.

8. The method of claim 1, further comprising updating the obstruction based on the verification of the obstruction.

9. The method of claim 1, wherein generating the verification strategy according to the obstruction and the vehicle movement pattern comprises using one or more machine learning algorithms.

10. A computing system for detecting and verifying obstructions on a road comprising:
- one or more processors; and
- memory coupled to the one or more processors to store instructions, which when executed by the one or more processors, cause the one or more processors to perform operations, the operations comprising:
  - detecting, from road conditions data, an obstruction;
  - determining a vehicle movement pattern according to the obstruction;
  - generating a verification strategy according to the obstruction and the vehicle movement pattern;
  - selecting a subset of vehicles to verify the obstruction;
  - controlling the subset of vehicles in accordance with the verification strategy to collect verification data on the obstruction, wherein controlling the subset of vehicles in accordance with the verification strategy comprises routing each of the subset of vehicles to encounter the obstruction and navigating each of the subset of vehicles around the obstruction according to the vehicle movement pattern;
  - receiving the verification data on the obstruction from the subset of vehicles; and
  - verifying the obstruction based on the verification data.

11. The computing system of claim 10, wherein the road conditions data is obtained from a sensor of a vehicle.

12. The computing system of claim 11, wherein the sensor comprises at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

13. The computing system of claim 10, wherein the obstruction comprises at least one of a pothole, crack, tire marking, faded road marking, debris, objects, occlusion, road reflection, flooding, ice, oil leak, uneven pavement, erosion and raveling.

14. The computing system of claim 10, wherein the selecting the subset of vehicles comprises:
- determining a first vehicle within a distance threshold to the obstruction; and
- determining the first vehicle comprises a sensor capable of collecting the verification data on the obstruction.

15. The computing system of claim 10, wherein the selecting the subset of vehicles comprises:
- determining a first vehicle enroute to the obstruction; and
- determining the first vehicle comprises a sensor capable of collecting the verification data on the obstruction.

16. The computing system of claim 10, wherein the vehicle movement pattern is updated according to driving data of vehicles encountering the obstruction.

17. The computing system of claim 10, further comprising updating the obstruction based on the verification of the obstruction.

18. The non-transitory machine-readable medium of claim 17, wherein generating the verification strategy according to the obstruction and the vehicle movement pattern comprises using one or more machine learning algorithms.

19. The computing system of claim 10, wherein generating the verification strategy according to the obstruction and the vehicle movement pattern comprises using one or more machine learning algorithms.

20. A non-transitory machine-readable medium having instructions stored therein, which when executed by a processor, cause the processor to perform operations, the operations comprising:
- detecting an obstruction based on road conditions data;
- determining a vehicle movement pattern according to the obstruction;
- generating a verification strategy according to the obstruction and the vehicle movement pattern;

selecting a subset of vehicles to verify the obstruction;

controlling the subset of vehicles in accordance with the verification strategy to collect verification data on the obstruction, wherein controlling the subset of vehicles in accordance with the verification strategy comprises routing each of the subset of vehicles to encounter the obstruction and navigating each of the subset of vehicles around the obstruction according to the vehicle movement pattern;

receiving the verification data on the obstruction from the subset of vehicles; and verifying the obstruction based on the verification data.

* * * * *